(12) United States Patent
Kim

(10) Patent No.: US 7,452,469 B1
(45) Date of Patent: Nov. 18, 2008

(54) APPARATUS HAVING ROTARY ACTIVATED BACCILLUS CONTRACTOR FOR PURIFYING SEWAGE AND WASTEWATER AND METHOD USING THE SAME

(76) Inventor: Kyung Jin Kim, 124-902, Jangan Town, 71, Bundang-dong, Bundang-gu, Seongnam-si, Gyeonggi-do (KR) 463-831

( * ) Notice: Subject to any disclaimer, the term of this patent is extended or adjusted under 35 U.S.C. 154(b) by 13 days.

(21) Appl. No.: 11/761,935

(22) Filed: Jun. 12, 2007

(51) Int. Cl.
*C02F 3/08* (2006.01)
*C02F 3/12* (2006.01)

(52) U.S. Cl. .................. 210/619; 210/621; 210/624; 210/626; 210/151; 210/195.1; 210/195.3

(58) Field of Classification Search ............ 210/619, 210/621, 622, 624, 626, 150, 151, 195.1, 210/195.3, 202, 259
See application file for complete search history.

(56) References Cited

U.S. PATENT DOCUMENTS

| | | | | |
|---|---|---|---|---|
| 3,466,241 A | * | 9/1969 | Simpson | 210/619 |
| 3,849,303 A | * | 11/1974 | Torpey | 210/619 |
| RE29,969 E | * | 4/1979 | Torpey | 210/619 |
| 4,289,626 A | * | 9/1981 | Knopp et al. | 210/619 |
| 4,530,763 A | * | 7/1985 | Clyde et al. | 210/619 |
| 4,563,282 A | * | 1/1986 | Wittmann et al. | 210/619 |
| 5,248,422 A | * | 9/1993 | Neu | 210/626 |
| 5,290,435 A | * | 3/1994 | Stilkenboom | 210/151 |
| 6,783,669 B1 | * | 8/2004 | Okagawa et al. | 210/150 |
| 2005/0133444 A1 | * | 6/2005 | Warrow | 210/619 |

* cited by examiner

Primary Examiner—Christopher Upton
(74) Attorney, Agent, or Firm—Sheridan Ross P.C.

(57) ABSTRACT

Disclosed herein is an apparatus for purifying sewage and wastewater, including a general automatic impurity treating apparatus; a equalization tank; a distribution tank; a microbe contact tank provided with a rotary activated *bacillus* contactor comprising a reticular rotator comprising a flat fan-shaped body composed of a synthetic fiber, a first solidification portion 28 formed of Saran latex, which is placed on the body, a spacer insert hole, formed between the body and the first solidification portion and bored such that the hole is integrated with the body and the first solidification portion, and a second solidification portion, formed of Saran latex, which is provided in the spacer insert hole; a measuring tank; a bioreaction tank; a settling tank; a sludge thickener; an aerated liquid circulation pump connected to the bioreaction tank and circulating part of the sewage and wastewater discharged into the settling tank to the distribution tank and the measuring tank; and a sludge returning pump connected to the settling tank and returning part of sludge precipitated in the settling tank to the distribution tank and the measuring tank.

11 Claims, 11 Drawing Sheets

APPARATUS HAVING ROTARY ACTIVATED *BACCILLUS* CONTRACTOR FOR PURIFYING SEWAGE AND WASTEWATER AND METHOD USING THE SAME

BACKGROUND OF THE INVENTION

1. Field of the Invention

The present invention relates to an apparatus and method for purifying sewage and wastewater, and, more particularly, to an apparatus and method for purifying sewage and wastewater, which can remove 90% or more of nitrogen and phosphorus from sewage and wastewater.

2. Description of the Related Art

Generally, conventional technologies for purifying highly concentrated persistent organic wastewater are based on a standard activated sludge process. Using the conventional technologies, a considerable amount of organic matter and suspended solids included in wastewater can be removed, but eutrophication and red tide phenomena occur because nitrogen and phosphorus, which are nutritive salts, are not easily removed from wastewater. Further, in the conventional technologies, nitrogen is removed using a method of nitrifying nitrogen, creating an anaerobic or anoxic state, and then expelling any remaining air, and phosphorus is removed using a method of inducing the discharge of phosphorus by creating an anaerobic state, making microbes ingest excess phosphorus while converting the anaerobic state into an aerobic state, and then dewatering sludge together with phosphorus. However, in the above methods, the efficiency of nitrogen and phosphorus removal is in the range of 50 to 60% or less, continuously stable water quality cannot be obtained because the process is sensitive to decreases in water temperature and to variation of water quality and the amount of water, and highly advanced technical skills are required to operate the equipment because a large amount of power is necessary to nitrify nitrogen and the processes are complicated. Further, the above methods have problems in that equipment for removing bad smells generated in each process must be additionally installed, and the equipment has a short life because it easily corrodes, and the cost of maintaining the equipment is high.

Among conventional biological processes for treating sewage and wastewater, processes using rotary disks are commonly used, but in most of the processes modified plastic plates are used as a contactor of microbes.

An initial rotary disk type contactor has good purification efficiency because a large amount of biofilm adheres to the contactor when it is immersed in a sewage and wastewater tank in the range of about 30%, but simultaneously has both aerobic and anaerobic states because oxygen is not constantly supplied to the biofilm adhered to the rotary disk and the contactor is not uniformly in contact with inflowing sewage and wastewater. Accordingly, the initial rotary disk contactor has problems in that purification efficiency decreases because the activity of microbes for purification is hindered, bad smells are generated while the separation phenomenon occurs, and the contactor frequently breaks down because the biofilm irregularly adheres to the contactor, and thus the contactor does not rotate normally.

Conventional technologies for purifying sewage and wastewater using a rotary disk will be described as follows.

Korean Patent No. 0276095 discloses an apparatus and method for purifying sewage and wastewater using *Bacillus* species bacteria, in which sewage and wastewater, and microbes and *Bacillus* activator, including *Bacillus* species bacteria as a main component, are put into a rotary microbe contact tank, and then a porous rotator formed of synthetic fiber is rotated in a state in which the rotator is partially immersed in sewage and wastewater.

However, the rotary microbe contact tank has disadvantages in that, since the thickness of the biofilm adhered to the fiber is thin, the efficiency of sewage and wastewater purification is decreased when the temperature of inflowing sewage and wastewater is decreased, and the recovery time is long when apparatuses break down or there is an aberration in the culture of microbes during a sewage and wastewater purification process. Further, there is a problem in that since a rotary activated *bacillus* contactor has low durability, the rotary activated *bacillus* contactor is easily deformed and damaged, and thus the entire rotary activated *bacillus* contactor must be replaced in order to repair the damaged contactor.

SUMMARY OF THE INVENTION

Accordingly, the present invention has been made to overcome the above problems occurring in the prior art, and an object of the present invention is to provide an apparatus and method for purifying sewage and wastewater, which can remove persistent organic matter and suspended solids included in sewage and wastewater, increase the efficiency of nitrogen and phosphorus purification, which are nutritive salts, and remove various bad smelling materials generated in each treatment process.

In order to accomplish the above object, an aspect of the present invention provides an apparatus for purifying sewage and wastewater, including a general automatic impurity treating apparatus; a equalization tank; a distribution tank; a microbe contact tank provided with a rotary activated *bacillus* contactor comprising a reticular rotator comprising a flat fan-shaped body composed of a synthetic fiber, a first solidification portion 28 formed of Saran latex, which is placed on the body, a spacer insert hole, formed between the body and the first solidification portion and bored such that the hole is integrated with the body and the first solidification portion, and a second solidification portion, formed of Saran latex, which is provided in the spacer insert hole; a measuring tank; a bioreaction tank; a settling tank; a sludge thickener; an aerated liquid circulation pump connected to the bioreaction tank that circulates part of the sewage and wastewater discharged into the settling tank to the distribution tank and the measuring tank; and a sludge returning pump connected to the settling tank that returns part of sludge precipitated in the settling tank to the distribution tank and the measuring tank.

Another aspect of the present invention provides an apparatus for purifying sewage and wastewater, including a general automatic impurity treating apparatus; a equalization tank; a distribution tank; a microbe contact tank provided with a rotary activated *bacillus* contactor comprising a reticular rotator comprising a flat fan-shaped body composed of a synthetic fiber, a first solidification portion formed of Saran latex, which is placed on the body, a spacer insert hole, formed between the body and the first solidification portion and bored such that the hole is integrated with the body and the first solidification portion, and a second solidification portion, formed of Saran latex, which is provided in the spacer insert hole; a measuring tank; a bioreaction tank; a settling tank; a sludge thickener; an aerated liquid circulation pump connected to the bioreaction tank that circulates part of the sewage and wastewater discharged into the settling tank to the distribution tank and the measuring tank; a sludge returning pump connected to the settling tank that returns part of sludge precipitated in the settling tank to the distribution tank and the measuring tank; a chemical reaction tank connected to the settling tank that mixes an coagulant with the sewage and wastewater discharged from the settling tank; an flocculation tank connected to the chemical reaction tank that flocculation by injecting a polymer coagulant into sewage and wastewater discharged from the chemical reaction tank; an chemical settling tank connected to the flocculation tank that separates sewage and wastewater, including floc discharged from the flocculation tank, into solid and liquid fiactions; a sludge thickener connected to the chemical settling tank that removes solids discharged from the chemical settling tank through a dewatering process; and a discharge pipe connected to the chemical settling tank that discharges liquids, discharged from the chemical settling tank, to the outside.

A further aspect of the present invention provides a method of purifying sewage and wastewater, including the steps of removing suspended solids included in sewage and wastewater by sequentially passing the sewage and wastewater through a general automatic impurity treating apparatus and a equalization tank; removing pollutants included in sewage and wastewater by injecting a *Bacillus* activator into sewage and wastewater passing through the general automatic impurity treating apparatus and the equalization tank and then passing the sewage and wastewater including the *Bacillus* activator through a distribution tank and a microbe contact tank provided with a rotary activated *bacillus* contactor including a reticular rotator; forming MLSS by passing the sewage and wastewater that has passed through the step of removing pollutants through a measuring tank and a bioreaction tank, thus removing organic matter and suspended solids included in the sewage and wastewater; controlling the concentration of adhered and suspended microbes included in the sewage and wastewater that has passed through the microbe contact tanks and the bioreaction tank by moving the sewage and wastewater that has passed through the step of forming MLSS to the settling tank and circulating part of the sewage and wastewater to the distribution tank and the measuring tank; separating MLSS included in the sewage and wastewater into solid and liquid fractions by passing the sewage and wastewater that has passed through the step of controlling the concentration of adhered and suspended microbes through a settling tank; and treating sludge by circulating some of the solids included in the sewage and wastewater, having passed through the step of separating MLSS, to the distribution tank and the measuring tank, passing non-circulated solids through a sludge thickener, thus treating the solids, and discharging supernatant liquids outside.

A still further aspect of the present invention provides a method of purifying sewage and wastewater, including the steps of removing suspended solids included in sewage and wastewater by sequentially passing the sewage and wastewater through a general automatic impurity treating apparatus and a equalization tank; removing pollutants included in sewage and wastewater by injecting a *Bacillus* activator into sewage and wastewater that has passed through the general automatic impurity treating apparatus and the equalization tank and then passing the sewage and wastewater, including the *Bacillus* activator, through a distribution tank and a microbe contact tank provided with a rotary activated *bacillus* contactor including a reticular rotator; forming MLSS by passing the sewage and wastewater that has passed through the step of removing pollutants through a measuring tank and a bioreaction tank and thus removing organic matter and suspended solids included in the sewage and wastewater; controlling the concentration of adhered and suspended microbes included in the sewage and wastewater passing through the microbe contact tanks and the bioreaction tank by moving the sewage and wastewater that has passed through the step of forming MLSS to the settling tank and circulating part of the sewage and wastewater to the distribution tank and the measuring tank; separating MLSS included in the sewage and wastewater into solid and liquid fractions by passing the sewage and wastewater that has passed through the step of controlling the concentration of adhered and suspended microbes through a settling tank; treating sludge by circulating some of the solids included in the sewage and wastewater that has passed through the step of separating MLSS to the distribution tank and the measuring tank, passing non-circulated solids through a sludge thickener, thus treating the solids, and discharging supernatant liquids outside; flocculation by passing liquids included in the sewage and wastewater that has passed through the step of separating MLSS through a chemical reaction tank, in which an coagulant is injected, thus reacting phosphorus, suspended solids and a color, included in the liquids, with the coagulant; flocculation by passing the liquids that have passed through the step of flocculation through an flocculation tank, in which a polymer coagulant is injected; and treating floc by passing the liquids that have passed through the step of flocculation through an chemical settling tank, separating the liquids including floc into solid and liquid fractions, and then passing the separated solids through a sludge thickener, thus treating the solids, and discharging the supernatant liquids outside.

The microbe contact tank according to the present invention is an apparatus for supplying oxygen to sewage and wastewater including a *Bacillus* activator inflowing from a distribution tank that contacts a rotary activated *bacillus* contactor provided in the microbe contact tank, thereby treating the sewage and wastewater. The structure of the microbe contact tank is not limited as long as the microbe contact tank can accomplish the above object, but preferably the microbe contact tank has a structure that is commonly used in the related field, and more preferably has a sealed structure. In this case, a plurality of, and preferably two, three or four, microbe contact tanks may be disposed in parallel such that sewage and wastewater flows into the microbe contact tanks in a parallel fashion.

The rotary activated *bacillus* contactor is adhered with a biofilm, which is a *Bacillus* species bacteria, and rotates in a state in which the rotary activated *bacillus* contactor is partially immersed in sewage and wastewater and thus supplies oxygen in the atmosphere to sewage and wastewater, so that the *Bacillus* bacteria, contained in the biofilm, becomes a dominant species, and pollutants, such as nitrogen and the like, included in sewage and wastewater, are removed by contacting the *Bacillus* bacteria with the sewage and wastewater.

Further, the microbe contact tanks are provided in the lower portion thereof with air supply pipes, connected with a blower, and may be provided with drain pipes for draining deposits at the time of cleaning.

In this case, air supplied from the blower prevents deposits or other organic matter from accumulating and decaying in sewage and wastewater, decreases the weight of the rotary activated *bacillus* contactor by detaching a biofilm from the rotary activated *bacillus* contactor, and clears holes in the rotary activated *bacillus* contactor that have become clogged.

Meanwhile, the rotary activated *bacillus* contactor is configured such that a plurality of, and preferably 10 to 30, rotary disks are connected to each other through a spacer at predetermined intervals. Each of the rotary disks is formed such that 4 to 6 reticular rotators are connected to each other on the same line, and thus the rotary disk is formed in the shape of a disk.

The reticular rotator includes a flat fan-shaped body composed of a synthetic fiber; a first solidification portion formed of Saran latex, which is placed on the body; spacer insert holes, which are formed between the body and the first solidification portion and bored such that the hole is integrated with the body and the first solidification portion; and a second solidification portion, formed of Saran latex, which is provided in the spacer insert holes. Here, the "Saran latex" is a solution prepared by dissolving Saran in dimethylformamide.

In this case, since the reticular rotator has an apparent specific gravity of 0.04 to 0.08 g/cm$^3$, and a porosity of 97% or more, when the reticular rotator rotates, wastewater and air can move into the reticular rotator, thereby improving the growth of *Bacillus* species bacteria.

The synthetic fiber used for the reticular rotator is formed by adding a synthetic resin to vinylidene chloride and then copolymerizing the vinylidene chloride with the synthetic resin. The synthetic resin which is added to the vinylidene chloride may include PVC, vinylchloride acrylonitrile, acrylic acid ester, methyl methacrylate, and the like.

The chemical reaction tank according to the present invention is connected to the settling tank. The chemical reaction tank is an apparatus for flocculation by injecting an coagulant into the sewage and wastewater discharged from the settling tank. In the chemical reaction tank, sewage and wastewater is mixed with the coagulant using a stirrer provided in the chemical reaction tank, and the mixture reacts with phosphorus, suspended solids, color and the like, thereby flocculation. The sewage and wastewater including the floc moves to an flocculation tank. In this case, PAC (Poly Aluminium Chloride) or an iron salt may be used as the coagulant. Here, the "floc" is a large lump formed by coagulating and floc particles such as suspended solids, phosphorus compounds, microbes, and the like, in water.

The flocculation tank according to the present invention is connected to the chemical reaction tank. The flocculation tank is an apparatus for flocculation by injecting a polymer into the sewage and wastewater discharged from the chemical reaction tank. In the flocculation tank, a stirrer provided in the flocculation tank mixes floc, included in sewage and wastewater, with a polymer, thereby flocculation. The sewage and wastewater, in which the floe is aggregated, moves to an chemical settling tank. In this case, an anionic or nonionic polymer, specifically sodium polyacrylate, polyacrylamide, or polyethyleneoxide, may be used as the polymer coagulant.

The chemical settling tank according to the present invention is connected to the flocculation tank. The chemical settling tank is an apparatus for further separating the sewage and wastewater, including floe discharged from the flocculation tank into solid and liquid fractions. The sludge precipitated in the chemical settling tank moves to the sludge thickener through a sludge pump, and the supernatant liquid, that is, supernatant liquid, is discharged outside through a discharge pipe.

The sludge thickener according to the present invention is an apparatus for further separating sludge into concentrated sludge and supernatant liquid for a predetermined time in order to decrease the volume of the solid, for example sludge, precipitated in the settling tank and the chemical settling tank. The concentrated sludge is sent to a dewaterer and then separated into sludge cake and dewatering liquid. The sludge cake is taken at out and then buried, or is reused as fertilizer, and the supernatant liquid and dewatering liquid move to a equalization tank.

A method of manufacturing the reticular rotator for the apparatus for purifying sewage and wastewater according to the present invention includes (i) a mixing step of mixing a synthetic fiber; (ii) a molding step of heating the mixed synthetic fiber; (iii) a first coating step of coating the molded synthetic fiber with Saran latex; (iv) a spacer insert hole forming step of forming one or more spacer insert holes in the synthetic fiber; (v) a second coating step of coating the spacer insert hole with Saran latex; (vi) a drying step of drying the Saran latex applied in the first coating step and the second coating step; (vii) a heat treatment step of heat-treating the dried synthetic fiber; and (viii) a cutting step of cutting the molding.

In this case, the synthetic fiber may be formed by adding a synthetic resin to vinylidene chloride and then copolymerizing the vinylidene chloride with the synthetic resin. The synthetic resin that is added to the vinylidene chloride may include PVC, vinylchloride acrylonitrile, acrylic acid ester, methyl methacrylate, and the like.

The mixing step is a step of cutting a synthetic fiber, preferably a copolymer of vinylidene chloride and a synthetic resin, to a size of 10 to 500 mm, and then mixing the cut synthetic fiber. In this step, the mixed synthetic fiber is formed into a curled shape.

The molding step is a step of heating the synthetic fiber formed in the mixing step. In this step, the synthetic fiber is molded at a temperature of 100 to 200', preferably 140 to 150° C., and for 1 to 10 seconds, preferably 2 to 3 seconds, such that the synthetic fiber, which is irregularly aggregated in a reticular shape, has a porosity of 97% or more, and the synthetic fibers molded in a reticular shape are uniformly arranged.

In the first coating step, the synthetic fiber formed through the molding step is immersed into Saran latex having a concentration of 10 to 40%, preferably 20 to 30%, and thus the Saran latex is applied on the outer surface of the synthetic fiber. The synthetic fiber, coated with the Saran latex, is then solidified at a temperature of 80 to 100° C. for 5 to 10 seconds, thereby forming a first solidification portion.

In the spacer insert hole forming step, one or more, preferably 1~10, and more preferably about six, spacer insert holes are formed in one surface, preferably along the outer surface of the synthetic fiber formed through the first coating step.

In the second coating step, Saran latex, having a concentration of 10 to 40%, and preferably 20 to 30%, is sprayed into the spacer insert holes formed in one surface of the synthetic fiber, and thus the Saran latex is applied on the inner surface of the spacer insert holes. The synthetic fiber, coated with the Saran latex, is then solidified at a temperature of 80 to 100° C. for 5 to 10 seconds, thereby forming a second solidification portion.

In the drying step, the synthetic fiber formed through the first coating step and second coating step is dried at a temperature of 80 to 100° C. for 5 to 10 seconds in a state in which fiber tissues are adhered to each other at intersecting portions thereof, while the synthetic fiber moves longitudinally.

In the heat treatment step, the synthetic fiber formed through the drying step is heat-treated at a temperature of 100 to 200° C., preferably 140 to 150° C., and for 1 to 5 seconds, preferably 2 to 3 seconds, and then the heat-treated synthetic fiber is solidified.

In the cutting step, the synthetic fiber formed through the heat treatment step is extruded to a thickness of 4 to 5 cm and a size of 10 to 20 cm, and then the extruded synthetic fiber is cut.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENT

Figure 1:
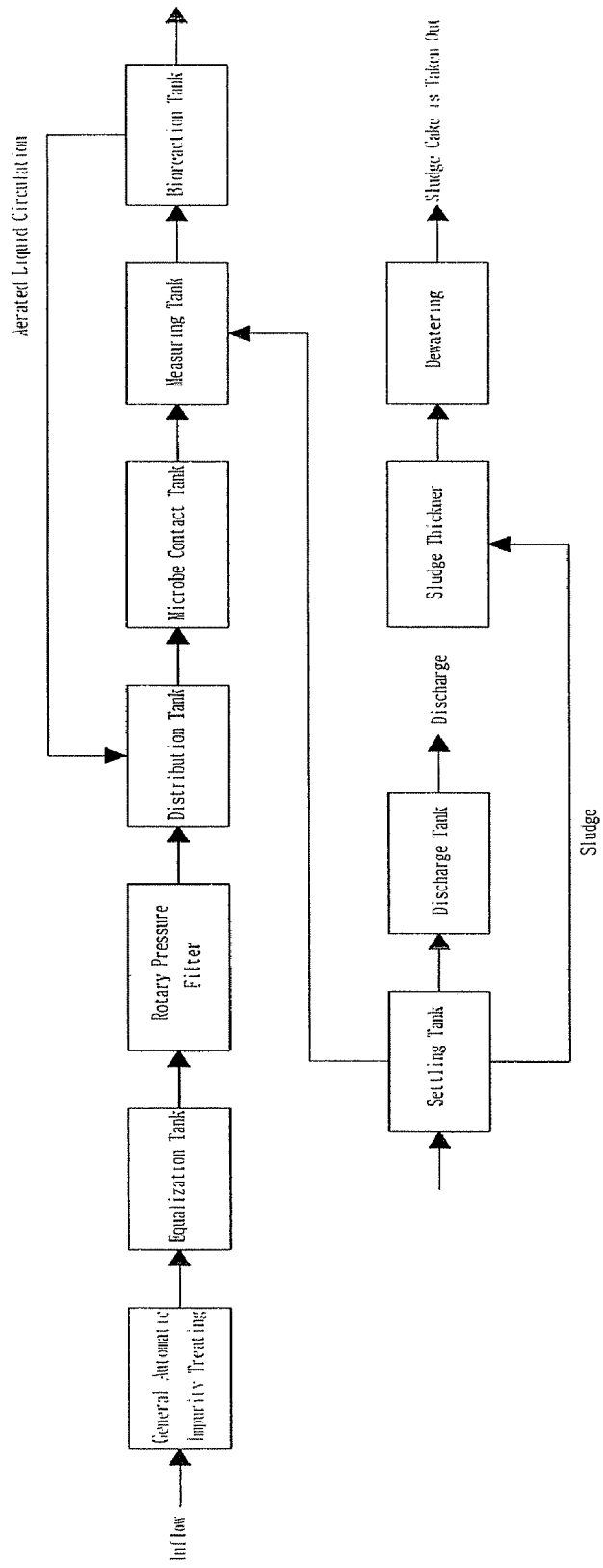
FIG. 1 is a process diagram of a conventional apparatus for purifying sewage and wastewater.

Hereinafter, preferred embodiment of the present invention will be described in detail with reference to the attached drawings. However, the following description is set forth to illustrate the present invention, and should not be construed as the limit of the present invention.

Reference should now be made to the drawings, in which the same reference numerals are used throughout the different drawings to designate the same or similar components.

Figure 2:
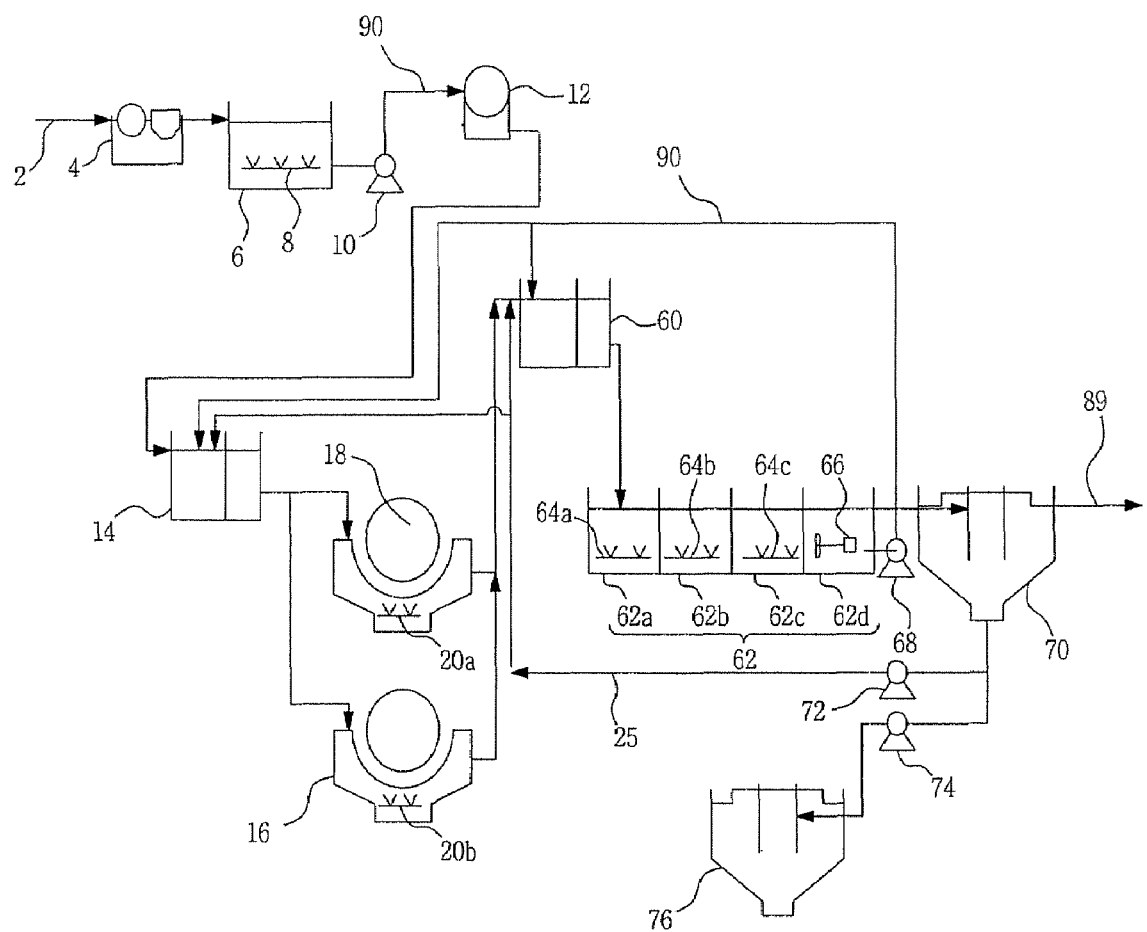
FIG. 2 is a schematic view showing an apparatus for purifying sewage and wastewater according to an embodiment of the present invention.
Figure 3:
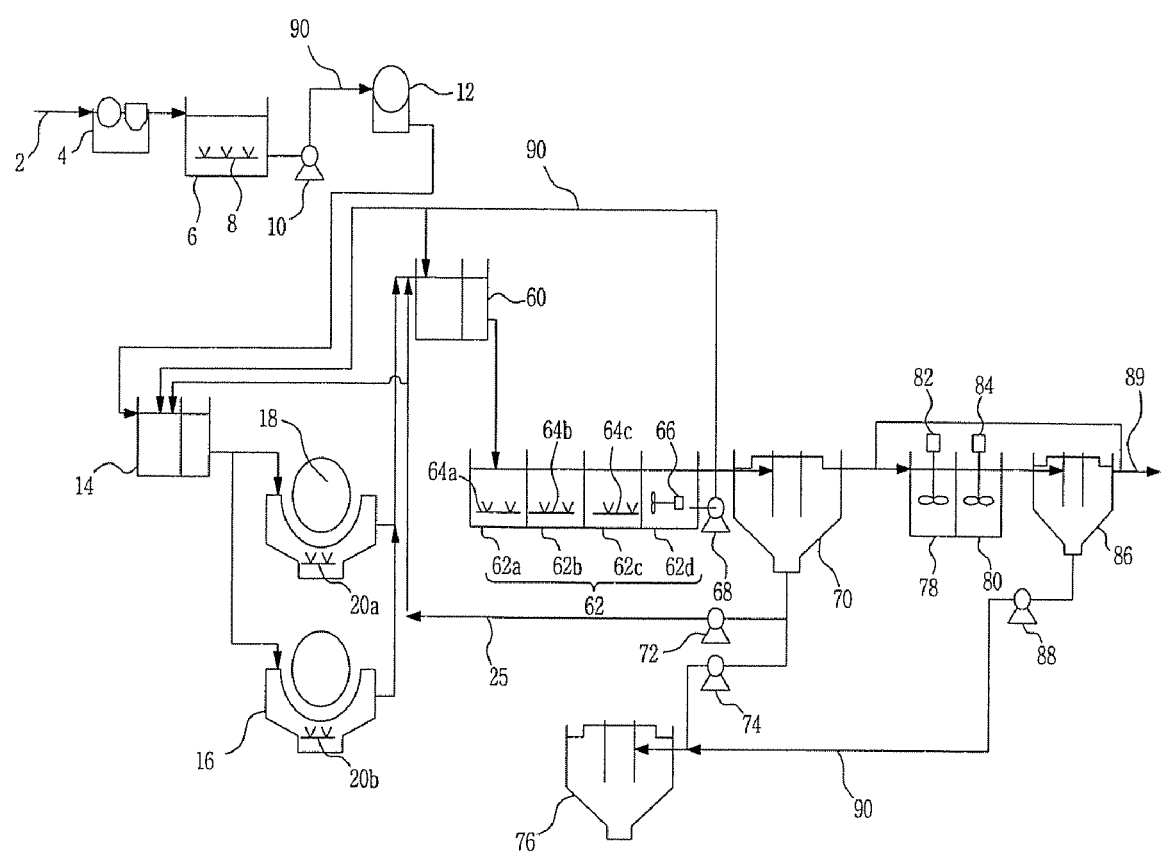
FIG. 3 is a schematic view showing an apparatus for purifying sewage and wastewater according to another embodiment of the present invention.
Figure 4:
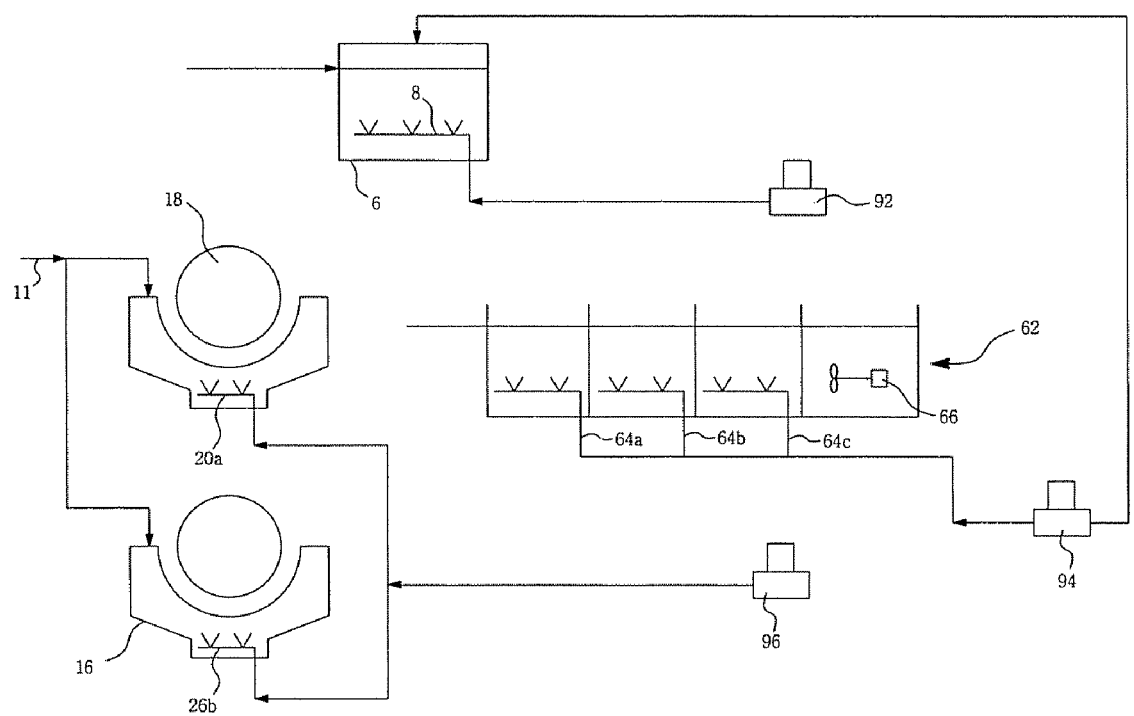
FIG. 4 is a view showing a process of supplying air to a equalization tank, a microbe contact tank and a bioreaction tank according to the present invention.
Figure 5:
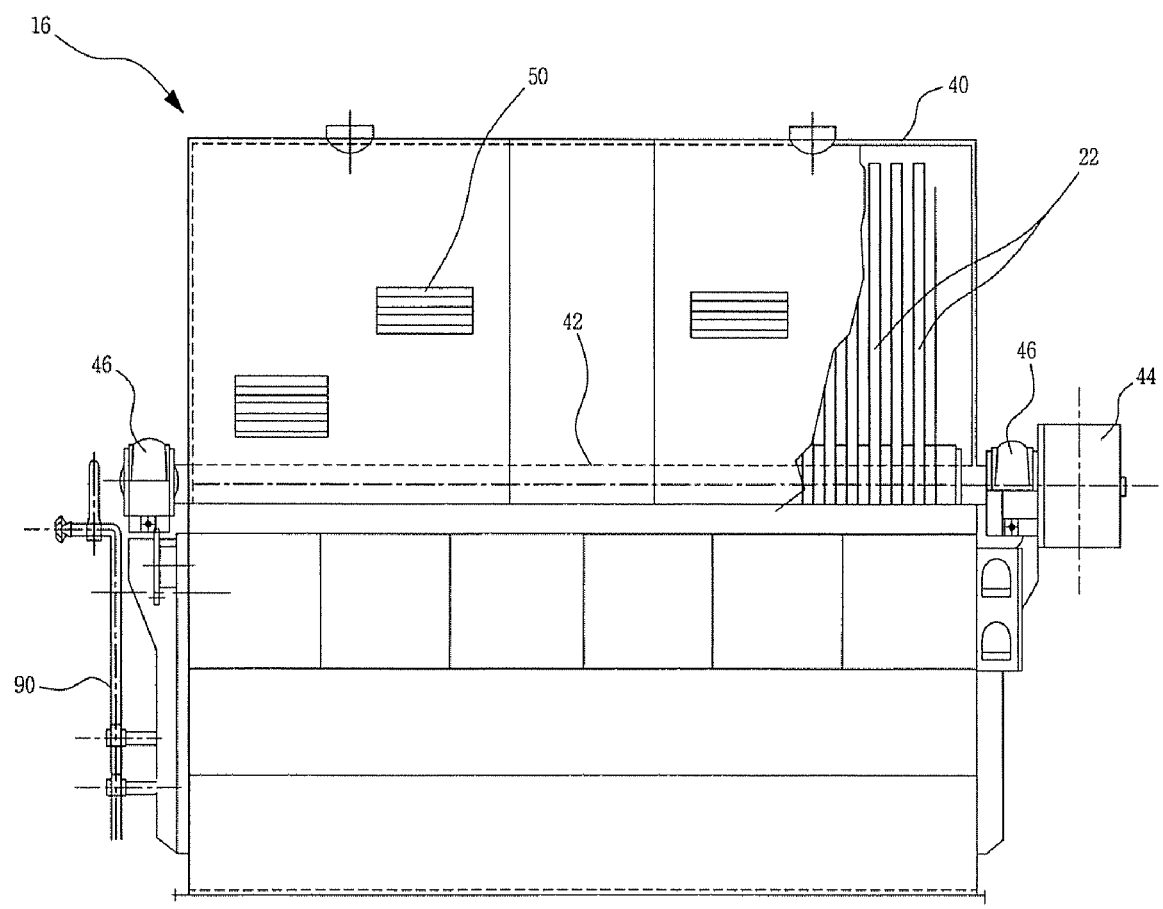
FIG. 5 is a partial side view showing an apparatus for purifying sewage and wastewater according to the present invention.
Figure 6:
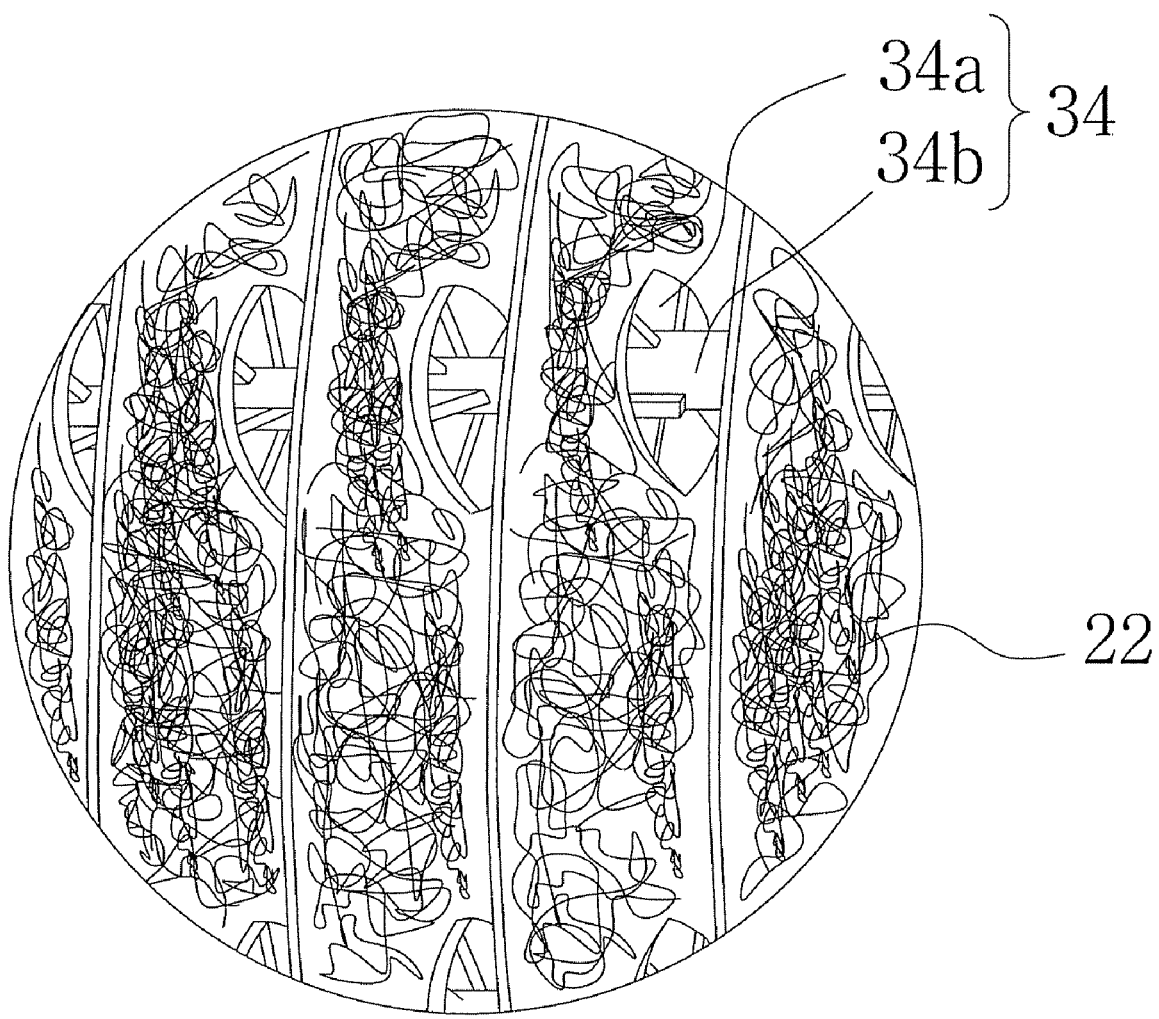
FIG. 6 is an enlarged cross-sectional view showing a rotary activated *bacillus* contactor according to the present invention.
Figure 7:
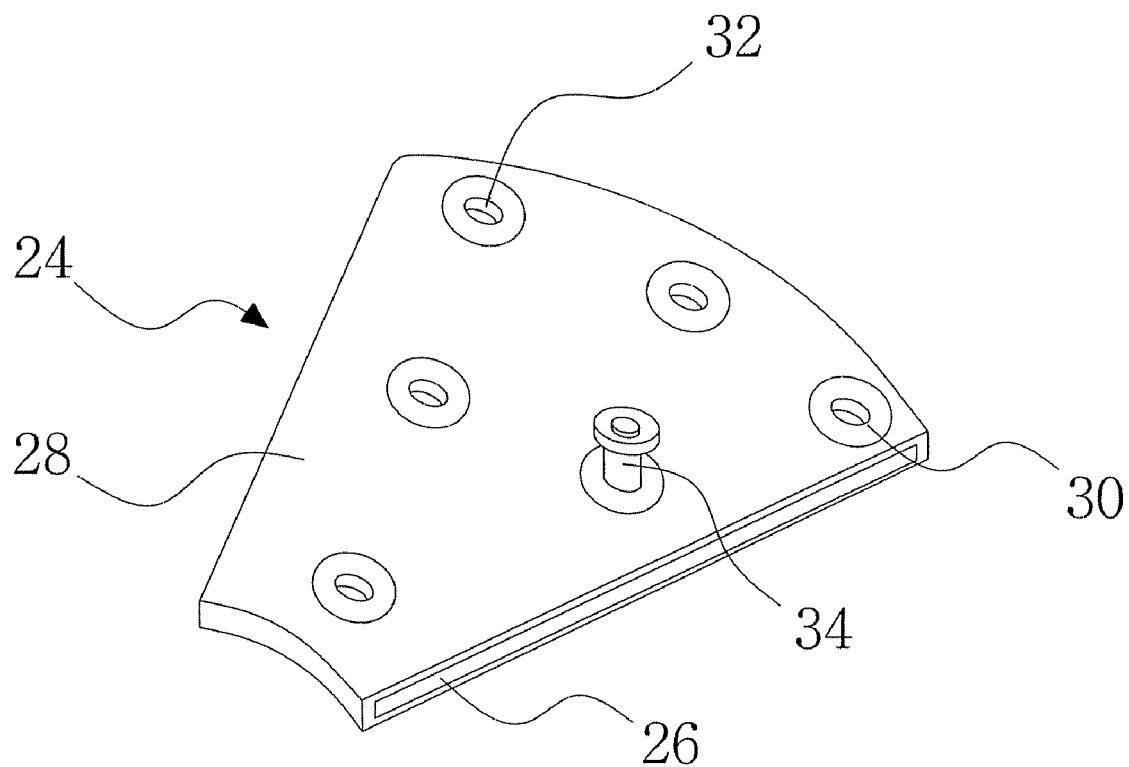
FIG. 7 is a perspective view showing a reticular rotator according to the present invention.
Figure 8:
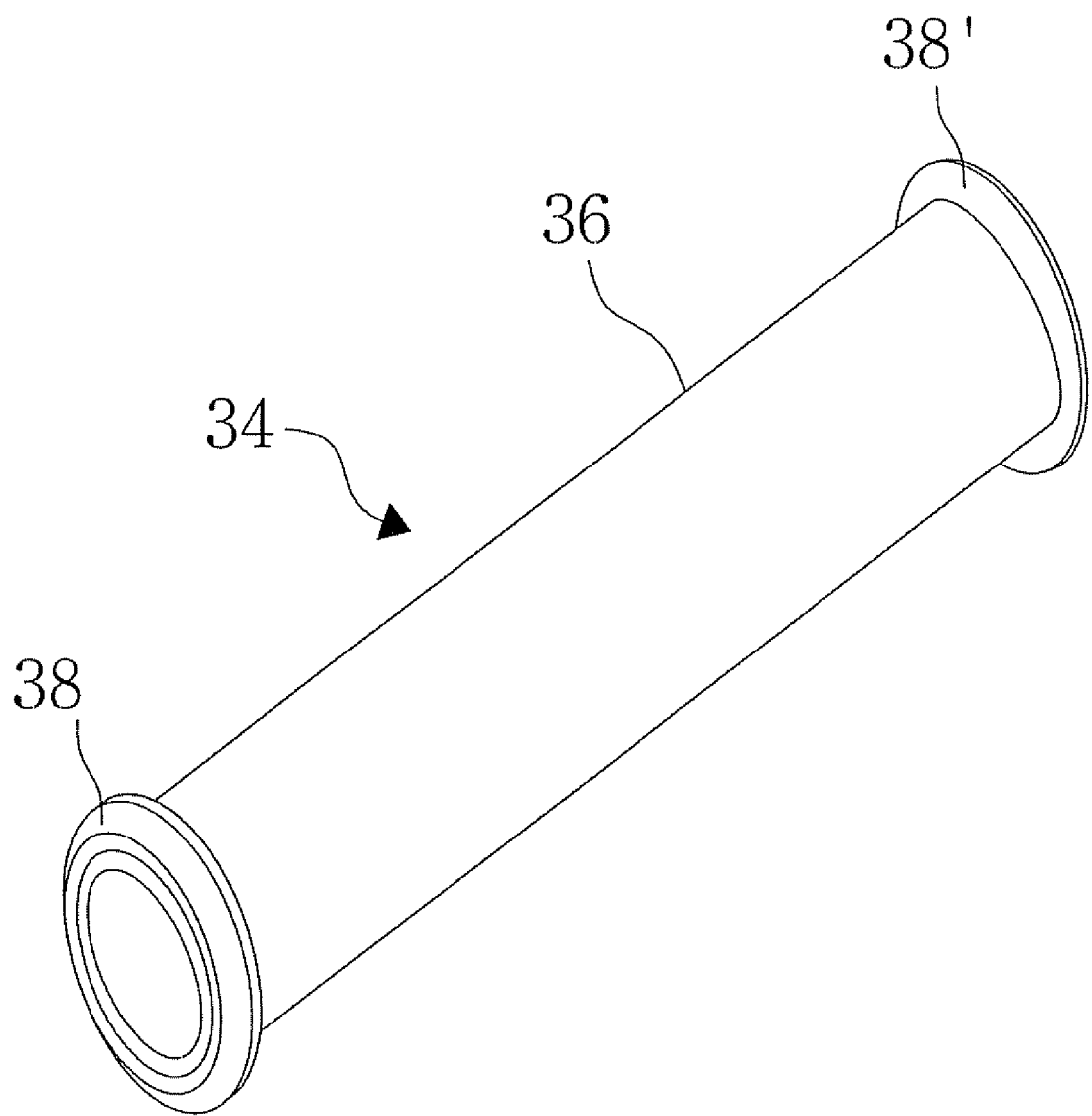
FIG. 8 is a perspective view showing a spacer according to an embodiment of the present invention.
Figure 9:
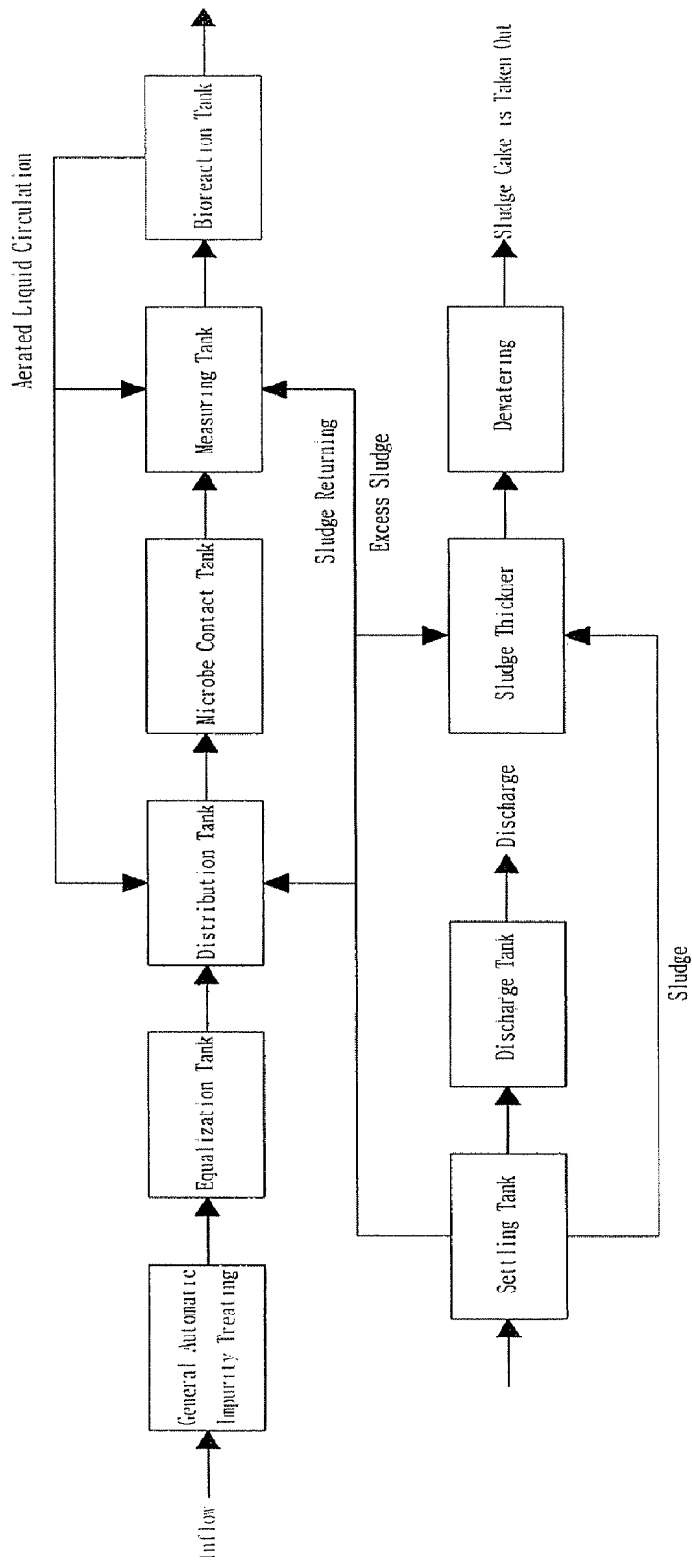
FIG. 9 is a process diagram of an apparatus for purifying sewage and wastewater according to an embodiment of the present invention.
Figure 10:
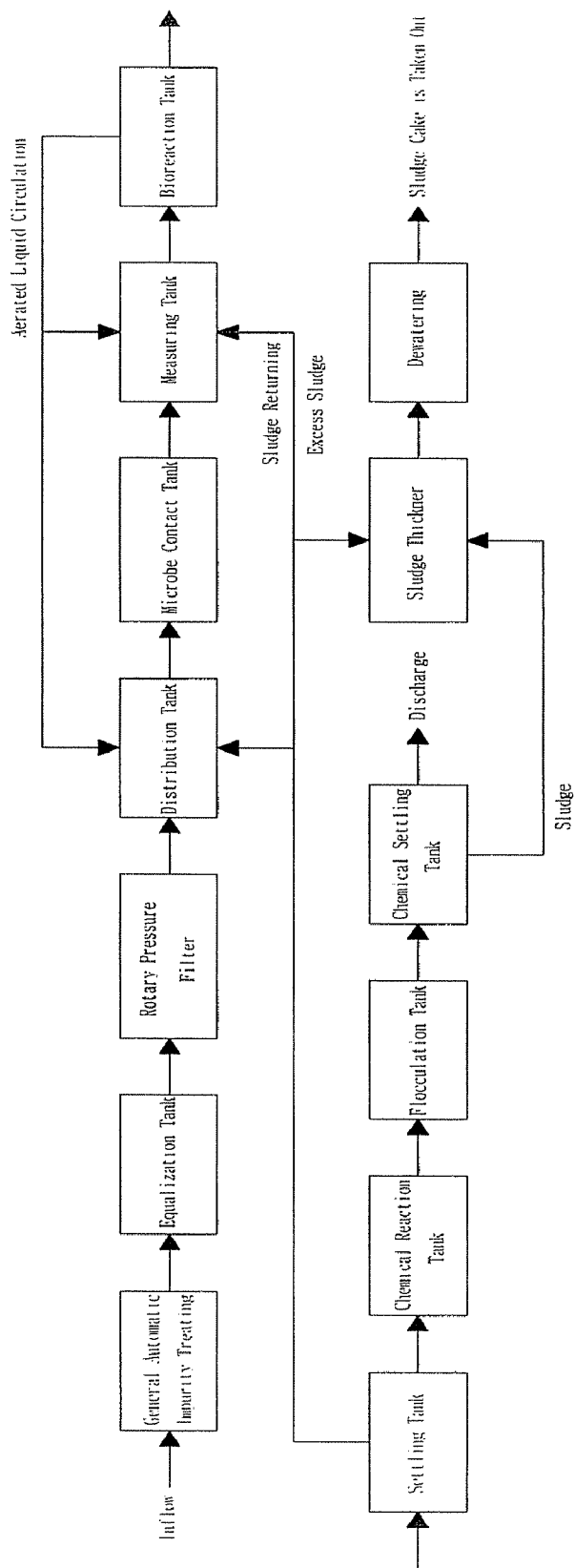
FIG. 10 is a process diagram of an apparatus for purifying sewage and wastewater according to another embodiment of the present invention.
Figure 11:
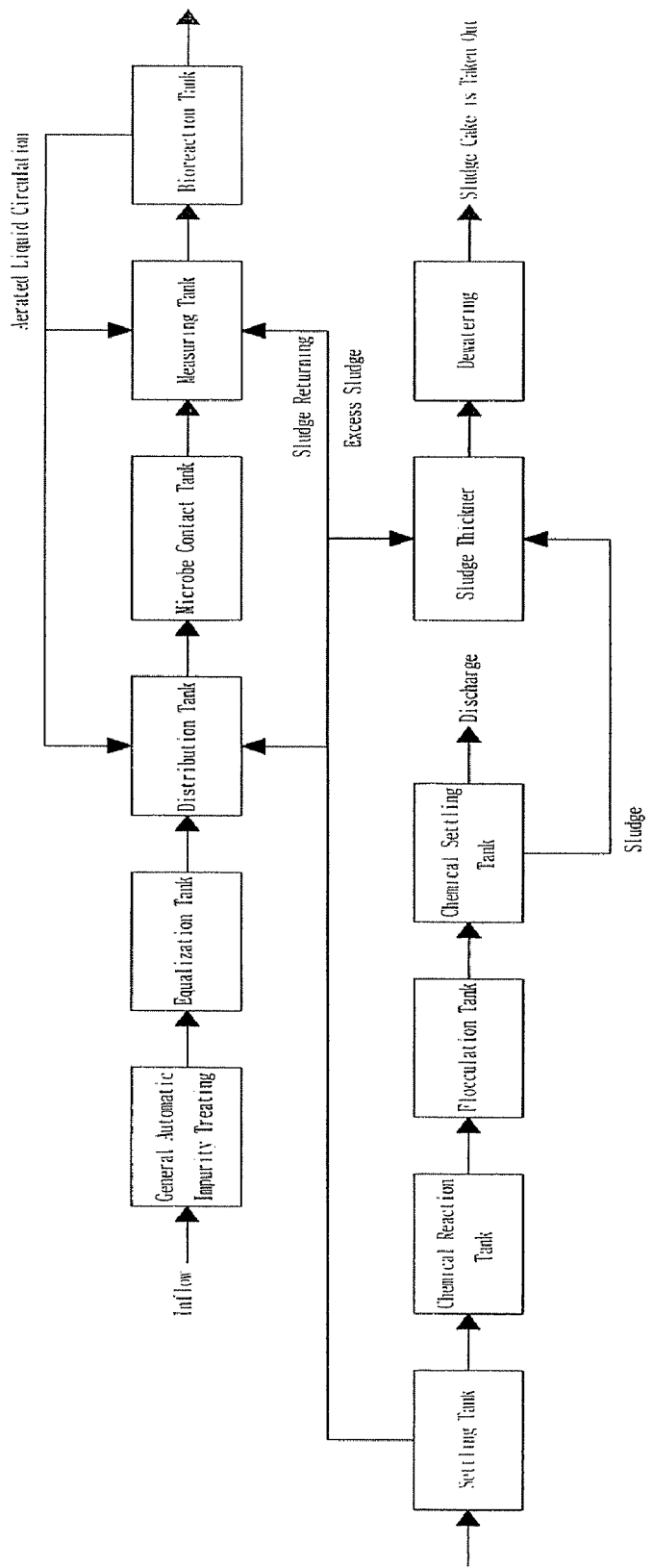
FIG. 11 is a process diagram of an apparatus for purifying sewage and wastewater according to a further embodiment of the present invention.

Here, FIG. 2 is a configuration view showing an apparatus for purifying sewage and wastewater according to an embodiment of the present invention, FIG. 3 is a configuration view showing an apparatus for purifying sewage and wastewater according to another embodiment of the present invention, FIG. 4 is a view showing a process of supplying air to a equalization tank, a microbe contact tank and a bioreaction tank according to the present invention, FIG. 5 is a partial side view showing an apparatus for purifying sewage and wastewater according to the present invention, FIG. 6 is an enlarged cross-sectional view showing a rotary activated *bacillus* contactor according to the present invention, FIG. 7 is a perspective view showing a reticular rotator according to the present invention, FIG. 8 is a perspective view showing a spacer according to an embodiment of the present invention, FIG. 9 is a process diagram of an apparatus for purifying sewage and wastewater according to an embodiment of the present invention, FIG. 10 is a process diagram of an apparatus for purifying sewage and wastewater according to another embodiment of the present invention, and FIG. 11 is a process diagram of an apparatus for purifying sewage and wastewater according to a further embodiment of the present invention.

As shown in FIG. 2, an apparatus for purifying sewage and wastewater according to the present invention includes a general automatic impurity treating apparatus 4, a equalization tank 6, a distribution tank 14, microbe contact tanks 16 provided with respective rotary activated *bacillus* contactors 18, a measuring tank 60, a bioreaction tank 62, a settling tank 70, and a sludge thickener 76.

The general automatic impurity treating apparatus 4 according to the present invention is an apparatus for removing suspended solids, having a size of 10 mm or more, included in sewage and wastewater using a coarse screen (not shown) provided in the general automatic impurity treating apparatus 4, in which, when sewage and wastewater flows into the device through an inlet pipe 2, suspended solids included in the sewage and wastewater are removed, and then the sewage and wastewater, from which the suspended solids have been removed, moves to a equalization tank 6.

The equalization tank 6 according to the present invention is an apparatus for improving the purification efficiency and resultant water quality of the apparatus for purifying sewage and wastewater of the present invention. Variations in the flow rate and water quality of sewage and wastewater inflowing from the general automatic impurity treating apparatus 4 are equalized, and then the sewage and wastewater, having high water quality, moves to a distribution tank 14 at the same flow rate through a raw water pump 10.

If necessary, the equalization tank 6 may further include a blower for a equalization tank 92.

The blower for a equalization tank 92 supplies air into the equalization tank 6 at a flow rate of about 0.015 Nm³/min per unit volume through an air supply pipe for a equalization tank 8 provided in the equalization tank 6, thereby preventing the deposition of suspended solids, equalizing the water quality of inflowing sewage and wastewater, and preventing the decay of sewage and wastewater.

The distribution tank 14 according to the present invention is an apparatus for distributing sewage and wastewater such that sewage and wastewater uniformly flows into each of the microbe contact tanks 16 when a plurality of microbe contact tanks 16 are connected and provided downstream of the distribution tank 14. Sewage and wastewater moves to each of the microbe contact tanks 16 uniformly, due to control of the outflow rate of the sewage and wastewater inflowing from the equalization tank 6.

A predetermined amount of *Bacillus* activator may be put into the distribution tank 14 every day in order to accelerate the growth and sporogenesis of *Bacillus* species bacteria.

Here, the kind of *Bacillus* activator is not limited, as long as it accelerates the growth and sporogenesis of *Bacillus* species bacteria. Preferably, they may be *Bacillus* activators commonly used in the related field.

If necessary, a rotary pressure filter 12 may further be provided between the equalization tank 6 and the distribution tank 14. This rotary pressure filter 12 is an apparatus for removing suspended solids having a size of 5 to 10 mm included in sewage and wastewater inflowing from the equalization tank 6.

The microbe contact tanks 16 according to the present invention are provided therein with respective rotary activated *bacillus* contactors 18 including respective reticular rotators 24. Each of the microbe contact tanks 16 is an apparatus for purifying sewage and wastewater inflowing from the distribution tank 14, from which pollutants included in the sewage and wastewater inflowing from the distribution tank 14 have been removed, and then the purified sewage and wastewater moves to a measuring tank 60.

The microbe contact tanks 16 may be provided, in the lower portion thereof, with air supply pipes 20a and 20b, connected with a blower 96 for a microbe contact tank, and with respective drain pipes (not shown) for draining deposits at the time of cleaning. In this case, the blower 96 for a microbe contact tank is connected to a deodorizing pipe (not shown) for capturing bad smells generated from treatment equipment, so that the bad smells are injected into the microbe contact tanks 16, thereby decomposing the bad smells through reaction with *Bacillus* species bacteria.

In this case, air supplied to the microbe contact tanks 16 prevents deposits or other organic matter from accumulating and decaying in sewage and wastewater, decreases the weight of the rotary activated *bacillus* contactors 18 by detaching a biofilm from the rotary activated *bacillus* contactors 18, and clears clogged holes in the reticular rotator 24.

As a specific aspect of the present invention, as shown in FIG. 5, in the microbe contact tanks 16 according to the present invention, the microbe contact tanks 16 are driven by a drive mechanism 44 horizontally connecting a shaft to bearings 46 provided at both ends of the microbe contact tanks 16, and a rotary shaft 42 is provided with rotary disks 22. Here, the rotary shaft 42 is provided with a plurality of rotary disks 22, preferably 10 to 30 rotary disks. Here, each of the rotary disks 22, as shown in FIG. 6, is provided therein with a spacer 34, including a blade 34a and a shaft 34b. Since the shaft 34b of the spacer 34 has a hollow portion, a connection shaft (not shown) is inserted and fixed into the hollow portion, so that the rotary disks 22, which are formed of synthetic fiber textures having a reticular structure, are disposed at predetermined intervals.

One part of the rotary disk 22 is immersed into sewage and wastewater, and the other part of the rotary disk 22 is exposed to air. Therefore, when the rotary disk 22 rotates, sewage and wastewater and air are simultaneously supplied to the fiber textures of the rotary disk 22. Further, since inspection windows 50 are provided in the covers 40 of the microbe contact tanks 16, the operational state in the microbe contact tanks 16 can be inspected.

The measuring tank 60 according to the present invention is an apparatus for measuring the amount of inflowing sewage and wastewater and sewage and wastewater sludge returned from apparatuses disposed downstream of the measuring tank 60, and for moving the inflowing sewage and wastewater and returned sludge to a bioreaction tank 62.

The bioreaction tank 62 according to the present invention is an apparatus including a plurality of chambers, preferably four chambers, into which a predetermined amount of air is injected such that the sewage and wastewater inflowing from the measuring tank 60 comes into contact with microbes. Pollutants, such as organic matter, nitrogen, and the like, are removed through metabolism, thereby forming MLSS (Mixed Liquor Suspended Solids). In the bioreaction tank 62, the sewage and wastewater including MLSS moves to a settling tank, and part of the sewage and wastewater moves to the distribution tank 14 or measuring tank 60 through an aerated liquid circulation pump 68.

As a specific aspect, the bioreaction tank 62 according to the present invention includes four chambers. Here, a blower for a bioreaction tank 94 supplies air to first, second, and third chambers of the bioreaction tank 62 through air supply pipes 64a, 64b and 64c respectively provided in the first, second, and third chambers. In this case, the first chamber 62a is supplied with about 70% of the air, based on the total amount of air supplied to the bioreaction tank 62, the second chamber 62b is supplied with about 20% of the air, based on the total amount of air supplied to the bioreaction tank 62, and the third chamber 62c is supplied with about 10% of the air, based on the total amount of air supplied to the bioreaction tank 62. Meanwhile, the last chamber of the bioreaction tank 62, for example, a fourth chamber 62d, is provided therein with an underwater stirrer 66 to prevent the sedimentation of sludge and to accelerate the sporogenesis of *Bacillus* species bacteria by decreasing the amount of dissolved oxygen.

The settling tank 70 according to the present invention is an apparatus for separating MLSS formed in the bioreaction tank 62 into solid and liquid fractions for a predetermined time. Here, sludge precipitated in the settling tank 70 moves to a sludge thickener 76 through an excess sludge pump 74, part of the sludge returns to the distribution tank 14 and measuring tank 60 through a sludge returning pump 72 to control the concentration of microbes adhered and suspended in the microbe contact tanks 16 and bioreaction tank 62, and separated supernatant liquid moves to a chemical reaction tank 78 or a discharge tank (not shown).

If necessary, the apparatus for purifying sewage and wastewater according to the present invention, as shown in FIG. 3, may further include a chemical reaction tank 78, an flocculation tank 80, and an chemical settling tank 86, disposed downstream of the settling tank 70, in order to improve the treatment capacity of phosphorus, suspended solids, color and the like included in sewage and wastewater.

The chemical reaction tank 78 according to the present invention is connected to the settling tank 70. The chemical reaction tank 78 is an apparatus for mixing an coagulant with the sewage and wastewater discharged from the settling tank 70. In the chemical reaction tank 78, a high-speed stirrer 82 provided in the chemical reaction tank 78 mixes sewage and wastewater with an coagulant, and thus reacts the coagulant with phosphorus, suspended solids, color and the like, so that floc is formed in the chemical reaction tank 78, thereby removing phosphorus, suspended solids, color and the like therefrom. The sewage and wastewater, in which floc is formed, moves to an flocculation tank 80.

The flocculation tank 80 according to the present invention is connected to the chemical reaction tank 78. The flocculation tank 80 is an apparatus for flocculation by injecting a polymer coagulant into the sewage and wastewater discharged from the chemical reaction tank 78. In the flocculation tank 80, a low-speed stirrer 84 provided in the flocculation tank 80 mixes floc, included in sewage and wastewater, with a polymer, thereby flocculation. The sewage and wastewater, in which floc is aggregated, moves to an chemical settling tank 86.

The chemical settling tank 86 according to the present invention is connected to the flocculation tank 80. The flocculation tank 86 is an apparatus for further separating the sewage and wastewater, including floc discharged from the flocculation tank 80, into solid and liquid fractions. The sludge precipitated in the chemical settling tank 86 moves to the sludge thickener 76 through a sludge pump 88, and separated supernatant liquid is discharged outside through a discharge pipe 89.

If necessary, a discharge tank may further be provided between the chemical settling tank 86 and the discharge pipe 89. Here, the discharge tank is an apparatus for temporarily storing sewage and wastewater before discharging the sewage and wastewater, in which the amount of sewage and wastewater discharged to the outside is controlled.

The sludge thickener 76 is an apparatus for further separating sludge into concentrated sludge and supernatant liquid for a predetermined time in order to decrease the volume of the sludge precipitated in the settling tank 70 and the chemical settling tank 86. The concentrated sludge separated from the sludge thickener 76 is taken out, or is sent to a dewaterer (not shown) and then separated into sludge cake and dewatering liquid. The sludge cake is taken out and then buried, or is reused as fertilizer, and the supernatant liquid and dewatering liquid move to the equalization tank 6.

In this case, apparatuses constituting the apparatus for purifying sewage and wastewater according to the present invention may be connected with each other using a transportation pipe 90. The transportation pipe 90 is a pipe for connecting the apparatuses to each other and transporting sewage and wastewater to each of the apparatuses. The transportation pipe 90 is not limited, as long as it can accomplish the object of the present invention, but preferably it may be a pipe commonly used in the related field, and more preferably may be a cylindrical pipe.

The apparatus for purifying sewage and wastewater according to the present invention, unlike a conventional apparatus for purifying sewage and wastewater, which includes a general automatic impurity treating apparatus 4, a equalization tank 6, a rotary pressure filter 12, a distribution tank 14, microbe contact tanks 16, a measuring tank 60, a bioreaction tank 62, a settling tank 70 and a sludge thickener 76, further includes the above described aerated liquid circulation pump 68, sludge returning pump 72, chemical reaction tank 78, flocculation tank 80 and chemical settling tank 86. Accordingly, the apparatus for purifying sewage and wastewater according to the present invention can purify nitrogen and phosphorus, which are nutritive salts, as well as persistent organic matter and suspended solids included in sewage and wastewater, at a purification efficiency of 90% or more. Further, in the apparatus for purifying sewage and wastewater according to the present invention, since the microbe contact tanks 16 are provided with respective rotary activated *bacillus* contactors 18, bad smelling material generated in the treatment processes can be removed.

Further, since biofilms containing a plurality of *Bacillus* bacteria species adhere to respective rotary activated *bacillus* contactors 18, highly concentrated wastewater having a BOD of 10,000 to 30,000 mg/tcan be purified without diluting it.

Meanwhile, the rotary activated *bacillus* contactors 18 according to the present invention include 10 or more, and preferably 30 rotary disks 22 and a plurality of spacers 34 for connecting the respective rotary disks 22. In this case, the rotary disks 22 are connected to each other at intervals of 40 to 60 mm, preferably about 50 mm, and a rotary shaft 42 longitudinally disposed in the apparatus for purifying sewage and wastewater can be inserted and fixed in the hollow portion of each of the rotary disks 22.

The rotary disks 22 are provided therein with a plurality of reticular rotators 24, preferably 10 to 30 reticular rotators 24, connected to each other on the same line, and the rotary disk 22 may be formed in the form of a hollow disk.

When the rotary disk 22, on which a biofilm is adhered, rotates in the state in which the lower portion of the rotary disk 22, based on the central axis thereof, is immersed in inflowing sewage and wastewater, for example the rotary disk 22 is immersed in the sewage and wastewater in the range of 25 to 50%, preferably 30%, based on the total area of the rotary disk 22, and thus the inflowing sewage and wastewater and air in the atmosphere simultaneously flow into the rotary disk 22, so that the sewage and wastewater comes into contact with Bacillus species bacteria adhered to the rotary disk 22, thereby purifying the sewage and wastewater.

The reticular rotator 24, as shown in FIG. 7, includes a flat fan-shaped body 26 composed of a synthetic fiber; a first solidification portion 28 formed of Saran latex, which is placed on the body 26; spacer insert holes 30 which are formed between the body 26 and the first solidification portion 28 and are bored such that the holes 30 are integrated with the body 26 and the first solidification portion 28; and a second solidification portion 32, formed of Saran latex, which is provided in the spacer insert holes 30.

The body 26 according to the present invention is formed in a flat fan-shape by molding synthetic fiber in a reticular shape. The inner structure of the body 26 is formed in a reticular shape, and the outer surface of the body 26 is solidified and thus reinforced. In this case, the body 26 may be molded at a temperature of 100 to 200° C., and preferably 140 to 150° C.

A fiber, obtained by adding vinylidene chloride to a synthetic resin and then copolymerizing the vinylidene chloride with the synthetic resin, may be used as the synthetic fiber. Specifically, it is preferred that Saran be used as the synthetic fiber. Here, the Saran is a fiber obtained by adding vinylidene chloride to PVC and then copolymerizing the vinylidene chloride with the PVC at a ratio of 90:10, and the diameter of yarn spun from the fiber is in the range of 0.3 to 1.0 mm.

Further, synthetic resins that can be added to the vinylidene chloride include PVC, vinylchloride acrylonitrile, acrylic acid ester, methyl methacrylate, and the like.

The reason for adding synthetic resin to the vinylidene chloride is that vinylidene chloride polymers have high crystallinity and a high softening point, so that thermomechanical treatment is difficult, with the result that the polymers cannot be used alone.

In this case, the body 26 is molded in a reticular shape such that the porosity of the synthetic fiber is 97% or more, so that sewage and wastewater can pass through the body 26, thereby increasing the durability of the body 26.

In a specific aspect, the body 26 according to the present invention may be configured to have an arc such that the central axis of the body 26 comes in contact with a rotary shaft 42.

The first solidification portion 28 according to the present invention is formed by coating the body 26 with Saran latex. Specifically, the first solidification portion 28 is formed by sequentially immersing the frame of the body into Saran latex for a predetermined time, applying Saran latex thereon, and then drying and tying it, such that the porosity of the first solidification portion 28 is in the range of 30 to 80%.

In the first solidification portion 28, Saran latex having a concentration of 10 to 40%, and preferably 20 to 30%, is additionally deposited on the outer surface of the body, so that the porosity of the first solidification portion 28 is set in the range of 30 to 80% by decreasing the porosity of the body 26, the porosity thereof being 97% or more, by 20% or more, thereby compacting the body 26. Therefore, the intersections of synthetic fibers are additionally solidified, so that the overall strength of the body 26 can be increased.

In the spacer insert hole 30 according to the present invention, a through-hole, into which a corresponding spacer 34 can be inserted, is formed in the reticular rotator 24 in order to connect a plurality of reticular rotators. One or more through-holes, preferably six through-holes, are formed in the body 26 and the first solidification portion 28 such that the spacer passes through the body 26 and the first solidification portion 28.

The shape of the spacer insert hole 30 is not limited, as long as the spacer 34 can be inserted, but it is preferred that the spacer insert hole 30 be formed in a cylindrical shape.

The second solidification portion 32 according to the present invention is formed to prevent the spacer insert hole 30 from being damaged when the spacer 34 is coupled with the spacer insert hole 30. The second solidification portion 32 is formed by coating the portion at which the spacer insert hole 30 is in contact with the spacer 34 with Saran latex having a concentration of 10 to 40%, and preferably 20 to 30%.

In this case, the second solidification portion 32 may be formed to have a porosity of 30 to 80% by decreasing the porosity of the body 26, the porosity thereof being 97% or more, by 20% or more through Saran latex coating.

The spacer 34 according to the present invention is inserted into the reticular rotator 24, constituting the rotary disk 22, and connects the rotary disks 22 to each other, thus integrating the rotary disks 22. The form of the spacer 34 is not limited, as long as the spacer 34 is inserted into the spacer insert hole 30 to thus connect the rotary disks 22 to each other, but it is preferred that the spacer 34 be a spacer commonly used in the related field.

In a specific aspect, the spacer 34 according to the present invention, as shown in FIG. 8, includes a spacer body 36 provided at both ends thereof with respective male screws, and a first flange 38 and a second flange 38' provided therein with respective female screws such that the female screws are coupled with the respective male screws. The flanges 38 and 38' are formed to have a diameter equal to 1.5-4 times that of the spacer body 36, and thus stably connect the reticular rotator 24.

In this case, the rotary disks 22 are rotated at a speed of 3 to 12 rpm by rotating a rotary shaft 42 using a drive mechanism 44. When dissolved oxygen (DO) increases, the rotation speed of the rotary disks 22 can be controlled by a rotation speed converter (not shown) which is electrically connected to a speed reducer.

That is, the rotation speed converter reduces the rotation speed thereof when the amount of dissolved oxygen (DO) is 1.5 ppm or more, and increases the rotation speed thereof when the amount of dissolved oxygen (DO) is 0.5 ppm or less.

A method of purifying sewage and wastewater according to the present invention includes the steps of removing suspended solids included in sewage and wastewater by sequentially passing the sewage and wastewater through a general automatic impurity treating apparatus 4 and a equalization tank 6; removing pollutants included in sewage and wastewater by injecting a *Bacillus* activator into sewage and wastewater that has passed through the general automatic impurity treating apparatus 4 and the equalization tank 6 and then passing the sewage and wastewater, including the *Bacillus* activator, through a distribution tank 14 and a microbe contact tank 16 provided with a rotary activated *bacillus* contactor 18 including a reticular rotator 24; forming MLSS by passing the sewage and wastewater that has passed through the step of removing pollutants through a measuring tank 60 and a bioreaction tank 62, thus removing organic matter and suspended solids included in the sewage and wastewater; controlling the concentration of adhered and suspended microbes included in the sewage and wastewater that has passed through the microbe contact tank 16 and the bioreaction tank 62 by moving the sewage and wastewater that has passed through the step of forming MLSS to the settling tank 70 and circulating part of the sewage and wastewater to the distribution tank 14 and the measuring tank 60; separating MLSS included in the sewage and wastewater into solid and liquid fractions by passing the sewage and wastewater that has passed through the step of controlling the concentration of adhered and suspended microbes through the settling tank 70; and treating sludge by circulating some of the solids included in the sewage and wastewater that has passed through the step of separating MLSS to the distribution tank 14 and the measuring tank 60, passing non-circulated solids through a sludge thickener 76, thus treating the solids, and discharging supernatant liquids outside.

If necessary, the method of purifying sewage and wastewater according to the present invention may further include the steps of flocculation by passing liquids included in the sewage and wastewater that has passed through the step of separating MLSS through a chemical reaction tank 78, in which the coagulant is injected, thus reacting phosphorus, suspended solids and a color included in the liquids with the coagulant; flocculation by passing the liquids that have passed through the step of flocculation through an flocculation tank 80, in which a polymer is injected; and treating floc by passing the liquids that have passed through the step of flocculation through an chemical settling tank 86, separating the liquids including floc into solid and liquid fractions, and then passing the separated solids through a sludge thickener 76, thus treating the solids, and discharging the supernatant liquids to the outside.

The step of removing suspended solids is a step of removing suspended solids included in sewage and wastewater by sequentially passing sewage and wastewater through a general automatic impurity treating apparatus 4 and a equalization tank 6. In this step, suspended solids, having a size of 10 nm or more, included in the sewage and wastewater are removed using a general automatic impurity treating apparatus 4, and the variation in the flow rate and water quality of sewage and wastewater is equalized through the equalization tank 6.

The step of removing pollutants is a step of removing pollutants included in sewage and wastewater by injecting a *Bacillus* activator into sewage and wastewater passing through the general automatic impurity treating apparatus 4 and the equalization tank 6 and then passing the sewage and wastewater, including the *Bacillus* activator, through a distribution tank 14 and a microbe contact tank 16 provided with a rotary activated *bacillus* contactor 18, including a reticular rotator 24. In this step, sewage and wastewater uniformly moves through the distribution tank 14 to each of the microbe contact tanks 16 disposed downstream of the distribution tank 14, and the sewage and wastewater comes into contact with *Bacillus* species bacteria included in the rotary activated *bacillus* contactors 18, thereby removing pollutants included in the sewage and wastewater.

If necessary, the method of purifying sewage and wastewater according to the present invention may further include, between the step of removing suspended solids and the step of removing pollutants, a step of removing fine suspended solids, having a size of 5 to 10 mm, included in sewage and wastewater using a rotary pressure filter 12.

In this case, the rotary activated *bacillus* contactors 18 include a reticular rotator 24 including a flat fan-shaped body 26 composed of a synthetic fiber; a first solidification portion 28 formed of Saran latex, which is placed on the body 26; spacer insert holes 30 which are formed between the body 26 and the first solidification portion 28 and are bored such that the holes 30 are integrated with the body 26 and the first solidification portion 28; and a second solidification portion 32, formed of Saran latex, which is provided in the spacer insert holes 30.

The step of forming MLSS is done by passing the sewage and wastewater that has passed through the step of removing pollutants through a measuring tank 60 and a bioreaction tank 62, thus removing organic matter and suspended solids included in the sewage and wastewater. In this step, a predetermined amount of air is supplied to the sewage and wastewater flowing from the microbe contact tanks 16 to the bioreaction tank 62 through the measuring tank 60, and thus organic matter and suspended solids, included in sewage and wastewater, are removed by metabolism, thereby forming MLSS.

In a first chamber of the bioreaction tank 62, dissolved oxygen (DO) is controlled at a concentration of about 1 mg/ℓ in order to intensively aerate sewage and wastewater with oxygen and to grow *Bacillus* species bacteria in filaments. In a second chamber 62b and a third chamber 62c of the bioreaction tank 62, dissolved oxygen (DO) is gradually controlled at a concentration of about 0.1 mg/ℓ or less, such that the sewage and wastewater is in low nutrition conditions. Further, in the last chamber 62d of the bioreaction tank 62, sewage and wastewater is stirred using an underwater stirrer 66, so that sludge cannot be deposited, with the result that nutritive cells of *Bacillus* species bacteria cannot grow, thereby promoting the formation of spores.

The step of controlling the concentration of microbes is a step of controlling the concentration of adhered and suspended microbes included in the sewage and wastewater passing through the microbe contact tank 16 and the bioreaction tank 62 by moving the sewage and wastewater that has passed through the step of forming MLSS to the settling tank 70 and circulating part of the sewage and wastewater to the distribution tank 14 and the measuring tank 60. In this step, some of the aerated liquid is circulated to the distribution tank 14 and the measuring tank 60 through an aerated liquid circulation pump 68 connected to the last chamber 62d of the bioreaction tank 62, part of the sludge is returned to the distribution tank 14 and the measuring tank 60 through a sludge returning pump 72 connected to the settling tank 70, and sludge and aerated liquid is returned from the last chamber 62d of the bioreaction tank 62 and the settling tank 70 in varying amounts, and is then circulated, in order to maintain the amount thereof constant thereby obtaining optimal growth conditions for *Bacillus* species bacteria.

The step of separating MLSS is a step of separating MLSS included in the sewage and wastewater into solid and liquid fractions by passing the sewage and wastewater that has passed through the step of controlling the concentration of adhered and suspended microbes through the settling tank. In this step, the sewage and wastewater including MLSS, which has not been circulated to the distribution 14 and the measuring tank 60, is separated into sludge and supernatant liquid for a predetermined amount of time, preferably 3 to 5 hours.

The step of treating sludge is done by circulating some of the solids included in the sewage and wastewater passing through the step of separating MLSS to the distribution tank 14 and the measuring tank 60, passing non-circulated solids through a sludge thickener 76, thus treating the solids, and discharging supernatant liquids outside. In this step, the concentration of adhered and suspended microbes included in the sewage and wastewater passing through the microbe contact tanks 16 and bioreaction tank 62 is controlled by circulating part of the sludge included in sewage and wastewater to the distribution tank 14 and the measuring tank 60, and non-circulated sludge moves to the sludge thickener 76 and is then separated into concentrated sludge and supernatant liquid for a predetermined time, preferably 6 to 12 hours. In this case, the concentrated sludge is sent to a dehydrator and is then separated into sludge cake and dewatering liquid.

The sludge cake is taken out and then buried, or is reused as fertilizer, and the separated liquid and dewatering liquid move to a equalization tank 6.

The step of flocculation is done by passing liquids included in the sewage and wastewater that passed through the step of separating MLSS through a chemical reaction tank 78, in which an coagulant is injected, thus reacting phosphorus, suspended solids and a color, included in the liquids, with the coagulant. In this step, floc having a size of 1 to 4 mm is formed by reacting the liquid with the coagulant using a high-speed stirrer 82 provided in the chemical reaction tank 78.

The step of flocculation is done by passing the liquid that has passed through the step of flocculation through the flocculation tank 80, in which a polymer is injected. In this step, the floc is floc to a size of 1 to 3 cm by mixing the floc and polymer included in the liquid using a low-speed stirrer 84 provided in the flocculation tank 80.

The step of treating floc is done by passing the liquids that have passed through the step of flocculation through an chemical settling tank 86, separating the liquids including floc into solid and liquid fractions, and then passing the separated solids through a sludge thickener 76, thus treating the solids, and discharging the supernatant liquids to the outside. In this step, the sludge precipitated in the chemical settling tank 86 is moved to the sludge thickener 76 using a sludge pump 88, and the separated supernatant liquid is discharged to the outside through a discharge pipe 89.

If necessary, the method of purifying sewage and wastewater according to the present invention may further include, after the step of treating floc, a step of passing the supernatant liquid through a discharge tank and then discharging it to the outside through a discharge pipe 89.

Hereinafter, the present invention will be described in detail with reference to examples. Here, these examples are set forth to illustrate the present invention, but should not be construed as the limit of the present invention.

Example 1

Example 1 is an exemplary operation using a process of disposing of sewage and wastewater as shown in FIG. 9. In Example 1, an apparatus for purifying sewage and wastewater according to the present invention was provided as slaughter equipment having a disposal capacity of 2,500 m$^3$/day, wherein wastewater including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof, and was then conducted for 3 months. The results of the wastewater purification were then analyzed.

In this case, thirty rotary disks were provided in the apparatus, rotary activated *bacillus* contactors rotated at a rotation speed of 4 to 12 rpm in a state where they are immersed in sewage and wastewater in the range of about 30% of their length, and the rotary activated *bacillus* contactors were variably operated such that the rotation speed thereof increased when dissolved oxygen (DO) was 0.5 ppm or less, and decreased when dissolved oxygen (DO) was 1.5 ppm or more, depending on the proliferation state of microbes. Here, dissolved oxygen (DO) was in the range of 0.5 to 1 mg/ℓ, and the thickness of biofilm was in the range of 2 to 3 cm. Further, in a first chamber of a bioreaction tank dissolved oxygen (DO) was 1.0 mg/ℓ, or less, the amount of MLSS was in the range of 5,000 to 6,000 mg/ℓ, and sludge capacity ($SV_{30}$) was about 90%. In a second chamber of a bioreaction tank, dissolved oxygen (DO) was about 0.5 mg/ℓ, and sludge capacity ($SV_{30}$) was about 80%. In a third chamber of a bioreaction tank, dissolved oxygen (DO) was about 0.2 mg/ℓ, and sludge capacity ($SV_{30}$) was about 70%. In a fourth chamber of a bioreaction tank, dissolved oxygen (DO) was about 0.001 mg/ℓ, and sludge capacity ($SV_{30}$) was about 60%. Moreover, a *bacillus* activator was added to a distribution tank in an amount of 0.04 Kg per 1 Kg of BOD load.

The results thereof are shown in Table 1.

TABLE 1

|  |  | $BOD_5$ | $COD_{Mn}$ | SS | T-N | T-P | reference |
|---|---|---|---|---|---|---|---|
| first day | raw water(mg/l) | 2,329 | 7,453 | 1,745 | 278 | 53 | influent water |
|  | effluent water(mg/l) | 4 | 45 | 5 | 4 | 0.6 | effluent water |
| second day | raw water(mg/l) | 3,250 | 10,411 | 4,620 | 325 | 38 | influent water |
|  | effluent water(mg/l) | 4 | 43 | 5 | 11 | 0.9 | effluent water |
| third day | raw water(mg/l) | 2,648 | 8,474 | 3,628 | 304 | 41 | influent water |
|  | effluent water(mg/l) | 5 | 45 | 10 | 3 | 0.7 | effluent water |
| fourth day | raw water(mg/l) | 2,702 | 8,647 | 3,167 | 332 | 42 | influent water |
|  | effluent water(mg/l) | 5 | 45 | 3 | 9 | 1 | effluent water |
| fifth day | raw water(mg/l) | 3,017 | 9,686 | 3,572 | 319 | 49 | influent water |
|  | effluent water(mg/l) | 5 | 45 | 6 | 5 | 0.7 | effluent water |
| sixth day | raw water(mg/l) | 2,923 | 9,354 | 4,135 | 311 | 45 | influent water |
|  | effluent water(mg/l) | 4 | 41 | 5 | 5 | 0.6 | effluent water |
| seventh day | raw water(mg/l) | 2,566 | 8,214 | 3,874 | 295 | 47 | influent water |
|  | effluent water(mg/l) | 4 | 42 | 4 | 8 | 0.6 | effluent water |
| eighth day | raw water(mg/l) | 3,351 | 10,723 | 4,852 | 35.6 | 52 | influent water |
|  | effluent water(mg/l) | 4 | 41 | 4 | 5 | 0.6 | effluent water |
| ninth day | raw water(mg/l) | 3,146 | 10,067 | 4,357 | 375 | 45 | influent water |
|  | effluent water(mg/l) | 5 | 49 | 5 | 7 | 0.5 | effluent water |
| tenth day | raw water(mg/l) | 3,074 | 9,837 | 4,058 | 348 | 48 | influent water |
|  | effluent water(mg/l) | 4 | 42 | 4 | 6 | 0.5 | effluent water |
| average | raw water(mg/l) | 2,901 | 9,287 | 3,801 | 324 | 46 | influent water |
|  | effluent water(mg/l) | 4.4 | 44.5 | 5.1 | 6.3 | 0.7 | effluent water |
| treatment efficiency(%) |  | 99.8 | 99.5 | 99.9 | 98.1 | 98.5 |  |

Example 2

Example 2 is an exemplary operation using a process of disposing of sewage and wastewater as shown in FIG. 9. In Example 2, an apparatus for purifying sewage and wastewater according to the present invention was provided as sewage disposal equipment having a disposal capacity of 2,5000 m$^3$/day, wastewater including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof and was then conducted for 3 months. The results of the wastewater purification were then analyzed.

In this case, thirty rotary disks were provided in the apparatus, rotary activated *bacillus* contactors rotated at a rotation speed of 3 to 4 rpm in a state where they are immersed in sewage and wastewater in the range of about 30% of their length, and the rotary activated *bacillus* contactors were variably operated such that the rotation speed thereof increased when dissolved oxygen (DO) was 0.5 ppm or less, and decreased when dissolved oxygen (DO) was 1.5 ppm or more, depending on the proliferation state of microbes. Here, dissolved oxygen (DO) was in the range of 0.5 to 1 mg/ℓ, and the thickness of biofilm was in the range of 1 to 2 cm. Further, in a first chamber of a bioreaction tank, dissolved oxygen (DO) was 1.0 mg/ℓ or less, the amount of MLSS was in the range of 3,000 to 4,000 mg/ℓ, and sludge capacity ($SV_{30}$) was about 90%. In a second chamber of a bioreaction tank, dissolved oxygen (DO) was about 0.5 mg/ℓ, and sludge capacity ($SV_{30}$) was about 80%. In a third chamber of a bioreaction tank, dissolved oxygen (DO) was about 0.2 mg/ℓ, and sludge capacity ($SV_{30}$) was about 60%. In a fourth chamber of a bioreaction tank, dissolved oxygen (DO) was about 0.2 mg/ℓ, and sludge capacity ($SV_{30}$) was about 60%. Moreover, a *bacillus* activator was added to a distribution tank in an amount of 0.02 Kg per 1 Kg of BOD load.

The results thereof are shown in Table 2.

TABLE 2

|  |  | $BOD_5$ | $COD_{Mn}$ | SS | T-N | T-P | coil bacteria (number/l) | reference |
|---|---|---|---|---|---|---|---|---|
| first day | raw water(mg/l) | 112 | 94 | 125 | 28 | 3 | 15,000 | influent water |
|  | effluent water(mg/l) | 5.3 | 7.8 | 2.7 | 8.1 | 0.4 | 250 | effluent water |
| second day | raw water(mg/l) | 129 | 97 | 131 | 37 | 4 | 100,000 | influent water |
|  | effluent water(mg/l) | 6.8 | 8.5 | 2.5 | 7.7 | 0.3 | 260 | effluent water |
| third day | raw water(mg/l) | 141 | 98 | 168 | 53 | 4 | 145,000 | influent water |
|  | effluent water(mg/l) | 7.4 | 9.0 | 2.3 | 3.8 | 0.4 | 570 | effluent water |
| fourth day | raw water(mg/l) | 109 | 73 | 120 | 27 | 2 | 134,000 | influent water |
|  | effluent water(mg/l) | 1.8 | 6.4 | 1.6 | 8.8 | 1.0 | 470 | effluent water |
| fifth day | raw water(mg/l) | 107 | 75 | 13.6 | 29 | 2 | 129,000 | influent water |
|  | effluent water(mg/l) | 4.9 | 7.3 | 2.7 | 5.5 | 0.6 | 250 | effluent water |
| sixth day | raw water(mg/l) | 139 | 84 | 192 | 36 | 4 | 146,000 | influent water |
|  | effluent water(mg/l) | 6.4 | 8.2 | 3.3 | 8.1 | 0.7 | 750 | effluent water |
| seventh day | raw water(mg/l) | 151 | 98 | 125 | 27 | 2 | 139,000 | influent water |
|  | effluent water(mg/l) | 4.3 | 6.1 | 6.4 | 7.9 | 0.5 | 150 | effluent water |
| eighth day | raw water(mg/l) | 115 | 78 | 160 | 34 | 3 | 128,000 | influent water |
|  | effluent water(mg/l) | 5.5 | 6.8 | 3.5 | 6.1 | 0.2 | 90 | effluent water |

TABLE 2-continued

|  |  | $BOD_5$ | $COD_{Mn}$ | SS | T-N | T-P | coil bacteria (number/l) | reference |
|---|---|---|---|---|---|---|---|---|
| ninth day | raw water(mg/l) | 156 | 96 | 135 | 29 | 3 | 138,000 | influent water |
|  | effluent water(mg/l) | 4.8 | 6.7 | 8.4 | 8.9 | 0.4 | 270 | effluent water |
| tenth day | raw water(mg/l) | 127 | 98 | 137 | 24 | 2 | 115,000 | influent water |
|  | effluent water(mg/l) | 4.4 | 6.8 | 3.5 | 7.9 | 0.5 | 160 | effluent water |
| average | raw water(mg/l) | 128.6 | 89.1 | 142.9 | 32.4 | 2.9 | 132,400 | influent water |
|  | effluent water(mg/l) | 5.2 | 7.4 | 3.7 | 7.4 | 0.5 | 332 | effluent water |
| treatment efficiency(%) |  | 99.8 | 99.5 | 99.9 | 98.1 | 98.5 | 99.8 |  |

Example 3

Example 3 is an exemplary operation using a process of disposing of sewage and wastewater as shown in FIG. 9. In Example 3, an apparatus for purifying sewage and wastewater according to the present invention was provided as sewage disposal equipment having a disposal capacity of 45,000 m³/day, wastewater including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof and was then conducted for 3 months. The results of the wastewater purification were then analyzed.

In this case, sewage and wastewater was purified in the same condition as in Example 2.

The results thereof are shown in Table 3.

more, average treatment efficiency of $COD_{Mn}$ was 89.8 or more, average treatment efficiency of SS was 95.6% or more, average treatment efficiency of T-N was 77.2% or more, average treatment efficiency of T-P was 82.8% or more, and average treatment efficiency of coli bacteria was 99.6% or more.

Accordingly, In the apparatus for purifying sewage and wastewater according to the present invention, the average treatment efficiencies of $BOD_5$, SS and $COD_{Mn}$ were equal to those of conventional apparatuses for purifying sewage and wastewater, but the average treatment efficiencies of T-N and T-P were excellent compared to those of conventional apparatuses for purifying sewage and wastewater.

TABLE 3

|  |  | $BOD_5$ | $COD_{Mn}$ | SS | T-N | T-P | coli bacteria (number/l) | reference |
|---|---|---|---|---|---|---|---|---|
| first day | raw water(mg/l) | 152 | 106 | 125 | 36 | 7 | 140,000 | influent water |
|  | effluent water(mg/l) | 5.4 | 10.8 | 12.5 | 11.2 | 0.7 | 920 | effluent water |
| second day | raw water(mg/l) | 115 | 81 | 160 | 35 | 6 | 145,000 | influent water |
|  | effluent water(mg/l) | 4.8 | 11.9 | 9.2 | 3.2 | 0.9 | 850 | effluent water |
| third day | raw water(mg/l) | 139 | 98 | 193 | 38 | 7 | 172,000 | influent water |
|  | effluent water(mg/l) | 5.5 | 11.4 | 9.5 | 10.1 | 0.3 | 520 | effluent water |
| fourth day | raw water(mg/l) | 167 | 117 | 159 | 38 | 8 | 189,000 | influent water |
|  | effluent water(mg/l) | 5.5 | 10.6 | 8.5 | 10.8 | 0.6 | 570 | effluent water |
| fifth day | raw water(mg/l) | 163 | 116 | 18.7 | 32 | 6 | 130,000 | influent water |
|  | effluent water(mg/l) | 8.4 | 12.4 | 5.0 | 8.6 | 0.7 | 180 | effluent water |
| sixth day | raw water(mg/l) | 142 | 98 | 168 | 53 | 9 | 126,000 | influent water |
|  | effluent water(mg/l) | 6.0 | 10.1 | 4.5 | 7.7 | 0.5 | 650 | effluent water |
| seventh day | raw water(mg/l) | 152 | 109 | 125 | 29 | 7 | 152,000 | influent water |
|  | effluent water(mg/l) | 7.2 | 10.3 | 7.0 | 7.6 | 1.6 | 930 | effluent water |
| eighth day | raw water(mg/l) | 162 | 114 | 157 | 35 | 7 | 147,000 | influent water |
|  | effluent water(mg/l) | 3.1 | 8.6 | 4.0 | 10.8 | 0.4 | 450 | effluent water |
| ninth day | raw water(mg/l) | 124 | 87 | 152 | 49 | 5 | 127,000 | influent water |
|  | effluent water(mg/l) | 5.9 | 8.4 | 5.5 | 7.6 | 0.5 | 560 | effluent water |
| tenth day | raw water(mg/l) | 145 | 102 | 164 | 5.0 | 8 | 151,000 | influent water |
|  | effluent water(mg/l) | 8.4 | 10.7 | 4.0 | 9.2 | 0.6 | 270 | effluent water |
| average | raw water(mg/l) | 146 | 102.8 | 159 | 40 | 7 | 147,900 | influent water |
|  | effluent water(mg/l) | 6.0 | 10.5 | 7.0 | 8.7 | 0.7 | 590 | effluent water |
| treatment efficiency(%) |  | 95.9 | 89.8 | 95.6 | 78.3 | 90.0 | 99.6 |  |

In the apparatus for purifying sewage and wastewater, when wastewater was purified, average treatment efficiency of $BOD_5$ was 99.8%, average treatment efficiency of $COD_{Mn}$ was 99.5, average treatment efficiency of SS was 99.9%, average treatment efficiency of T-N was 98.1%, and average treatment efficiency of T-P was 98.5%.

Further, in the apparatus for purifying sewage and wastewater according to the present invention, when sewage was purified, average treatment efficiency of $BOD_5$ was 95.9% or Example 4

Example 4 is an exemplary operation using a process of disposing of sewage and wastewater as shown in FIG. 10. In Example 4, an apparatus for purifying sewage and wastewater according to the present invention was provided as wastewater disposal equipment having a disposal capacity of 130 kℓ/day, wastewater, discharged from a pig pen, including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof and was then conducted for 3 months. The results of the wastewater purification were then analyzed.

In this case, thirty rotary disks were provided in the apparatus, rotary activeted *bacillus* contactors rotated at a rotation speed of 4 to 5 rpm in a state where they are immersed in sewage and wastewater in the range of about 30% of their length, and the rotary activeted bacillus contactors were variably operated such that the rotation speed thereof increased when dissolved oxygen (DO) was 0.5 ppm or less, and decreased when dissolved oxygen (DO) was 1.5 ppm or more, depending on the proliferation state of microbes. Here, dissolved oxygen (DO) was in the range of 0.5 to 1 mg/$\ell$, and the thickness of biofilm was in the range of 1 to 2 cm. Further, in a first chamber of a bioreaction tank, dissolved oxygen (DO) was 1.0 mg/$\ell$ or less, the amount of MLSS was in the range of 6,000 to 8,000 mg/$\ell$, and sludge capacity ($SV_{30}$) was about 90%. In a second chamber of a bioreaction tank dissolved oxygen (DO) was about 0.5 mg/$\ell$, and sludge capacity ($SV_{30}$) was about 80%. In a third chamber of a bioreaction tank dissolved oxygen (DO) was about 0.2 mg/$\ell$, and sludge capacity ($SV_{30}$) was about 70%. In a fourth chamber of a bioreaction tank, dissolved oxygen (DO) was about 0.001 mg/$\ell$, and sludge capacity ($SV_{30}$) was about 60%. Moreover, a *bacillus* activator was put into a distribution tank in an amount of 0.04 Kg per 1 Kg of BOD load.

The results thereof are shown in Table 4.

according to the present invention was provided as wastewater disposal equipment having a disposal capacity of 100 k$\ell$/day, wastewater, discharged from a dairy cattle pen, including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof and was then conducted for 3 months. The results of wastewater purification were then analyzed.

In this case, thirty rotary disks were provided in the apparatus, rotary activated *bacillus* contactors rotated at a rotation speed of 4 to 12 rpm in a state where they are immersed in sewage and wastewater in the range of about 30% of their length, and the rotary activated *bacillus* contactors were variably operated such that the rotation speed thereof increased when dissolved oxygen (DO) was 0.5 ppm or less, and decreased when dissolved oxygen (DO) was 1.5 ppm or more, depending on the proliferation state of microbes. Here, dissolved oxygen (DO) was in the range of 0.5 to 1 mg/$\ell$, and the thickness of biofilm was in the range of 1 to 2 cm. Further, in a first chamber of a bioreaction tank, dissolved oxygen (DO) was 1.0 mg/$\ell$ or less, the amount of MLSS was in the range of 5,000 to 6,000 mg/$\ell$, and sludge capacity ($SV_{30}$) was about 90%. In a second chamber of a bioreaction tank, dissolved oxygen (DO) was about 0.5 mg/$\ell$, and sludge capacity ($SV_{30}$) was about 80%. In a third chamber of a bioreaction tank, dissolved oxygen (DO) was about 0.2 mg/$\ell$, and sludge

TABLE 4

| | | $BOD_5$ | $COD_{Mn}$ | SS | T-N | T-P | reference |
|---|---|---|---|---|---|---|---|
| first day | raw water(mg/l) | 22,345 | 7,654 | 23,400 | 4,235 | 71.2 | influent water |
| | effluent water(mg/l) | 10 | 156 | 20 | 52 | 2.0 | effluent water |
| second day | raw water(mg/l) | 25,437 | 7,764 | 24,500 | 4,653 | 687 | influent water |
| | effluent water(mg/l) | 17 | 175 | 16 | 44 | 2.2 | effluent water |
| third day | raw water(mg/l) | 27,865 | 9,986 | 21,600 | 3,988 | 813 | influent water |
| | effluent water(mg/l) | 9 | 162 | 15 | 32 | 1.8 | effluent water |
| fourth day | raw water(mg/l) | 26,543 | 8,976 | 19,800 | 4,487 | 598 | influent water |
| | effluent water(mg/l) | 15 | 160 | 17 | 46 | 1.5 | effluent water |
| fifth day | raw water(mg/l) | 28,465 | 8,301 | 26,700 | 4,321 | 684 | influent water |
| | effluent water(mg/l) | 14 | 167 | 14 | 49 | 1.5 | effluent water |
| sixth day | raw water(mg/l) | 27,654 | 8,123 | 24,300 | 3,765 | 734 | influent water |
| | effluent water(mg/l) | 12 | 181 | 15 | 32 | 1.2 | effluent water |
| seventh day | raw water(mg/l) | 25,643 | 6,589 | 21,200 | 3,889 | 690 | influent water |
| | effluent water(mg/l) | 23 | 158 | 16 | 58 | 2.1 | effluent water |
| eighth day | raw water(mg/l) | 22,346 | 8,560 | 19,900 | 3,579 | 778 | influent water |
| | effluent water(mg/l) | 15 | 176 | 15 | 41 | 2.0 | effluent water |
| ninth day | raw water(mg/l) | 27,834 | 7,989 | 26,700 | 5,132 | 718 | influent water |
| | effluent water(mg/l) | 8 | 170 | 12 | 33 | 0.8 | effluent water |
| tenth day | raw water(mg/l) | 25,692 | 9,237 | 25,600 | 4,765 | 825 | influent water |
| | effluent water(mg/l) | 8 | 183 | 16 | 37 | 1.5 | effluent water |
| average | raw water(mg/l) | 26,022 | 7,496 | 24,370 | 4,281 | 724 | influent water |
| | effluent water(mg/l) | 12 | 169 | 16 | 39 | 1.3 | effluent water |
| treatment efficiency(%) | | 99.9 | 97.7 | 99.9 | 99.1 | 99.8 | |

Example 5

Example 5 is an exemplary operation using a process of disposing of sewage and wastewater as shown in FIG. 10. In Example 5, an apparatus for purifying sewage and wastewater capacity ($SV_{30}$) was about 60%. In a fourth chamber of a bioreaction tank, dissolved oxygen (DO) was about 0.001 mg/$\ell$, and sludge capacity ($SV_{30}$) was about 60%. Moreover, a *bacillus* activator was put into a distribution tank in an amount of 0.03 Kg per 1 Kg of BOD load.

The results thereof are shown in Table 5.

TABLE 5

|  |  | $BOD_5$ | $COD_{Mn}$ | SS | T-N | T-P | reference |
|---|---|---|---|---|---|---|---|
| first day | raw water(mg/l) | 2,860 | 2,350 | 11,250 | 680 | 27.5 | influent water |
|  | effluent water(mg/l) | 7 | 21 | 15 | 55 | 2.0 | effluent water |
| second day | raw water(mg/l) | 2,577 | 2,113 | 10,741 | 717 | 302 | influent water |
|  | effluent water(mg/l) | 5 | 14 | 18 | 51 | 1.5 | effluent water |
| third day | raw water(mg/l) | 2,764 | 2,239 | 13,172 | 653 | 271 | influent water |
|  | effluent water(mg/l) | 10 | 25 | 15 | 47 | 1.4 | effluent water |
| fourth day | raw water(mg/l) | 2,781 | 2,280 | 11,435 | 682 | 284 | influent water |
|  | effluent water(mg/l) | 8 | 22 | 12 | 42 | 1.4 | effluent water |
| fifth day | raw water(mg/l) | 2,829 | 2,319 | 10,427 | 732 | 317 | influent water |
|  | effluent water(mg/l) | 7 | 20 | 15 | 44 | 1.5 | effluent water |
| sixth day | raw water(mg/l) | 2,753 | 2,257 | 11,223 | 737 | 348 | influent water |
|  | effluent water(mg/l) | 5 | 13 | 10 | 36 | 0.8 | effluent water |
| seventh day | raw water(mg/l) | 2,496 | 2,047 | 11,457 | 625 | 356 | influent water |
|  | effluent water(mg/l) | 5 | 15 | 14 | 3.4 | 0.7 | effluent water |
| eighth day | raw water(mg/l) | 2,785 | 2,284 | 10,329 | 764 | 265 | influent water |
|  | effluent water(mg/l) | 7 | 15 | 10 | 38 | 1.2 | effluent water |
| ninth day | raw water(mg/l) | 2,753 | 2,230 | 10,568 | 772 | 316 | influent water |
|  | effluent water(mg/l) | 7 | 15 | 14 | 35 | 0.9 | effluent water |
| tenth day | raw water(mg/l) | 2,817 | 2,282 | 12,154 | 779 | 289 | influent water |
|  | effluent water(mg/l) | 5 | 15 | 10 | 31 | 0.7 | effluent water |
| average | raw water(mg/l) | 2,742 | 2,240 | 11,276 | 714 | 30.2 | influent water |
|  | effluent water(mg/l) | 7 | 18 | 13 | 41 | 1.2 | effluent water |
| treatment efficiency(%) |  | 99.7 | 99.2 | 99.9 | 94.3 | 99.6 |  |

Example 6

Example 6 is an exemplary operation using a process of disposing of sewage and wastewater as shown in FIG. 11. In Example 6, an apparatus for purifying sewage and wastewater according to the present invention was provided as slaughter equipment having a disposal capacity of 1,200 m³/day, wastewater, discharged from a sanitary landfill, including $BOD_5$, $COD_{Mn}$, SS, T-N, and T-P was introduced into the apparatus, and then the introduced sewage and wastewater was purified. Here, the wastewater has been purified for 10 days since a normal operation of the apparatus started through a test operation thereof and was then conducted for 3 months. The results of wastewater purification were then analyzed.

In this case, sewage and wastewater was purified in the same condition as in Example 2, except that 3,000 to 5,000 mg/ℓ of MLSS, instead of 5,000 to 6,000 mg/ℓ of MLSS, was supplied into a first chamber of a bioreaction tank of Example 2, and about 70% of sludge capacity, instead of about 60% of sludge capacity was supplied into a third chamber of a bioreaction tank of Example 2.

The results thereof are shown in Table 6.

TABLE 6

|  |  | $BOD_5$ | $COD_{Mn}$ | SS | T-N | T-P | reference |
|---|---|---|---|---|---|---|---|
| first day | raw water(mg/l) | 2,383 | 5,113 | 73.5 | 1,447 | 25 | influent water |
|  | effluent water(mg/l) | 38 | 231 | 10 | 17 | 0.9 | effluent water |
| second day | raw water(mg/l) | 3,173 | 8,974 | 87.7 | 2,052 | 28 | influent water |
|  | effluent water(mg/l) | 26 | 197 | 7 | 18 | 0.8 | effluent water |
| third day | raw water(mg/l) | 2,484 | 3,642 | 77.1 | 1,206 | 30 | influent water |
|  | effluent water(mg/l) | 44 | 275 | 5 | 20 | 0.7 | effluent water |
| fourth day | raw water(mg/l) | 2,415 | 5,479 | 697 | 1,649 | 22 | influent water |
|  | effluent water(mg/l) | 48 | 291 | 5 | 15 | 0.8 | effluent water |
| fifth day | raw water(mg/l) | 2,579 | 4,503 | 753 | 1,447 | 27 | influent water |
|  | effluent water(mg/l) | 25 | 158 | 4 | 12 | 0.6 | effluent water |
| sixth day | raw water(mg/l) | 2,961 | 6,916 | 84.2 | 1,575 | 25 | influent water |
|  | effluent water(mg/l) | 29 | 172 | 5 | 15 | 0.7 | effluent water |
| seventh day | raw water(mg/l) | 2,810 | 7,142 | 85.9 | 1,624 | 28 | influent water |
|  | effluent water(mg/l) | 32 | 215 | 6 | 21 | 0.7 | effluent water |
| eighth day | raw water(mg/l) | 3,075 | 8,329 | 8.41 | 1,736 | 25 | influent water |
|  | effluent water(mg/l) | 22 | 132 | 5 | 15 | 0.6 | effluent water |
| ninth day | raw water(mg/l) | 2,437 | 5,524 | 753 | 1,539 | 22 | influent water |
|  | effluent water(mg/l) | 25 | 463 | 4 | 17 | 0.8 | effluent water |
| tenth day | raw water(mg/l) | 2,751 | 5,638 | 812 | 1,325 | 24 | influent water |
|  | effluent water(mg/l) | 27 | 185 | 5 | 15 | 0.9 | effluent water |
| average | raw water(mg/l) | 2,707 | 6,126 | 790 | 1,560 | 26 | influent water |
|  | effluent water(mg/l) | 32 | 202 | 6 | 17 | 0.8 | effluent water |
| treatment efficiency(%) |  | 98.9 | 96.7 | 99.2 | 98.9 | 96.9 |  |

In the apparatus for purifying sewage and wastewater, including a chemical reaction tank, a flocculation tank and the chemical settling tank according to the present invention, average treatment efficiency of $BOD_5$ was 98.9% or more, average treatment efficiency of $COD_{Mn}$ was 96.7% or more, average treatment efficiency of SS was 99.2% or more, average treatment efficiency of T-N was 94.3% or more, and average treatment efficiency of T-P was 96.9% or more.

Comparative Example 1

Comparative Example 1 is an exemplary operation using a process of disposing of sewage and wastewater as shown in FIG. 1. In Comparative Example 1, wastewater discharged from milk and cheese manufacturing factories was introduced into a wastewater disposal plant having a disposal capacity of 2,500 m³/day, and then the introduced sewage and wastewater was purified for 3 days. The results of the wastewater purification were analyzed.

In this case, thirty rotary disks, formed of irregular reticular rotators having a porosity of 95.7% and an apparent specific gravity of 0.06 g/m3 prepared using vinylidene chloride, were provided in the apparatus, the rotary disks rotated at a rotation speed of 4 to 12 rpm in a state where they are immersed in sewage and wastewater in the range of about 30% of their length, and the rotary disks were variably operated depending on the proliferation state of microbes. Further, a *bacillus* activator was put into a distribution tank. Further, in a first chamber of a bioreaction tank, dissolved oxygen (DO) was 1.0 mg/ℓ or less, in a second chamber of a bioreaction tank, dissolved oxygen (DO) was about 0.1 mg/ℓ, and in a third chamber of a bioreaction tank, dissolved oxygen (DO) was about 0.001 mg/ℓ.

The results thereof are shown in Table 7.

Comparative Example 2

Comparative Example 2 is an exemplary operation using a conventional active sludge process. In Comparative Example 2, wastewater discharged from milk and cheese manufacturing factories was introduced into a wastewater disposal plant having a disposal capacity of 600 m³/day, and then the introduced sewage and wastewater was purified for 3 days. The results of the wastewater purification were analyzed.

The results thereof are shown in Table 7.

SS, T-N, and T-P were excellent compared to those of conventional apparatuses for purifying sewage and wastewater.

As described above, the apparatus for purifying sewage and wastewater according to the present invention is advantageous in that the purification capacity for $BOD_5$, $COD_{Mn}$, or SS is improved, nitrogen and phosphorus can be more reliably removed compared to conventional apparatuses for purifying sewage and wastewater, a large amount of organic matter can be treated because the apparatus is provided with reticular rotators with which aerobic conditions can be uniformly maintained, and thus a large number of microbes is present, and the sewage and wastewater purification capacity is increased because the conditions for cultivation and proliferation of microbes are optimized.

Although the preferred embodiment of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for purifying sewage and wastewater, comprising:
   a general automatic impurity treating apparatus for removing suspended solids;
   a equalization tank;
   a distribution tank;
   a microbe contact tank provided with a rotary activated *bacillus* contactor comprising a reticular rotator comprising a flat fan-shaped body composed of a synthetic fiber, a first solidification portion formed of latex, which is placed on the body, a spacer insert hole, formed between the body and the first solidification portion and bored such that the hole is integrated with the body and the first solidification portion, and a second solidification portion, formed of latex, which is provided in the spacer insert hole;

TABLE 7

| | | | Comparative Example 1 | | Comparative Example 2 | |
|---|---|---|---|---|---|---|
| | Measuring item | raw water (mg/l) | Treated water (mg/l) | efficiency (%) | Treated water (mg/l) | efficiency (%) |
| first day | $BOD_5$ | 328 | 1.8 | 99 | 11.6 | 96 |
| | $COD_{Mn}$ | 1,777 | 23.0 | 98 | 40.3 | 97 |
| | SS | 233 | 4.5 | 98 | 14.3 | 93 |
| | T-N | 80 | 3.7 | 95 | 20.0 | 75 |
| | T-P | 19 | 4.9 | 74 | 9.0 | 52 |
| second day | $BOD_5$ | 402 | 2.1 | 99 | 12.6 | 96 |
| | $COD_{Mn}$ | 1,325 | 16.0 | 98 | 44.2 | 96 |
| | SS | 720 | 5.0 | 99 | 16.0 | 97 |
| | T-N | 70 | 1.4 | 98 | 19.2 | 72 |
| | T-P | 20 | 2.6 | 87 | 11.3 | 43 |
| third day | $BOD_5$ | 502 | 2.5 | 99 | 15.2 | 96 |
| | $COD_{Mn}$ | 1,491 | 11.0 | 99 | 46.7 | 96 |
| | SS | 650 | 9.5 | 98 | 14.0 | 97 |
| | T-N | 69 | 2.1 | 96 | 20.6 | 70 |
| | T-P | 26 | 2.1 | 91 | 12.6 | 51 |

In the apparatus for purifying sewage and wastewater, including a chemical reaction tank, a flocculation tank, and an chemical settling tank, according to the present invention, the average treatment efficiencies of $BOD_5$ and $COD_{Mn}$ were equal to those of conventional apparatuses for purifying sewage and wastewater, but the average treatment efficiencies of a measuring tank;
a bioreaction tank;
a settling tank;
an aerated liquid circulation pump connected to the bioreaction tank and configured to recirculate part of the sewage and wastewater discharged into the settling tank to the distribution tank and the measuring tank;

a sludge returning pump connected to the settling tank and configured to return part of the sludge precipitated in the settling tank to the distribution tank and the measuring tank;

and a sludge thickener for treating the remainder of the sludge.

2. The apparatus for purifying sewage and wastewater according to claim 1, wherein the body has a porosity of 97%, and each of the first solidification portion and the second solidification portion has a porosity of 30 to 80%.

3. The apparatus for purifying sewage and wastewater according to claim 1, wherein the synthetic fiber is formed by adding a synthetic resin to vinylidene chloride and then copolymerizing the synthetic resin with the vinylidene chloride.

4. The apparatus for purifying sewage and wastewater according to claim 3, wherein the synthetic resin added to the vinylidene chloride is selected from a group consisting of PVC, vinylchloride acrylonitrile, acrylic acid ester, and methyl methacrylate.

5. The apparatus for purifying sewage and wastewater according to claim 1, further comprising:
a chemical reaction tank connected to the settling tank wherein a coagulant is mixed with the sewage and wastewater discharged from the settling tank;
a flocculation tank connected to the chemical reaction tank wherein floc is aggregated by adding a polymer into sewage and wastewater discharged from the chemical reaction tank;
a chemical settling tank connected to the flocculation tank wherein sewage and wastewater, including floc discharged from the flocculation tank, is separated into solid and liquid fractions;
a sludge thickener connected to the chemical settling tank wherein solids discharged from the chemical settling tank are removed through a dewatering process; and
a discharge pipe connected to the flocculation tank configured to discharge liquids discharged from the chemical settling tank to the outside.

6. The apparatus for purifying sewage and wastewater according to claim 5, wherein the polymer is an anionic polymer or a nonionic polymer.

7. The apparatus for purifying sewage and wastewater according to claim 5, wherein the coagulant is PAC or an iron salt.

8. A method of purifying sewage and wastewater, comprising the steps of:
removing suspended solids included in sewage and wastewater by sequentially passing the sewage and wastewater through a general automatic impurity treating apparatus and a equalization tank;
removing pollutants included in sewage and wastewater by injecting a *Bacillus* activator into sewage and wastewater that has passed through the general automatic impurity treating apparatus and the equalization tank and then passing the sewage and wastewater including the *Bacillus* activator through a distribution tank and a microbe contact tank provided with a rotary activated *bacillus* contactor including a reticular rotator;
forming MLSS by passing the sewage and wastewater that has passed through the step of removing pollutants through a measuring tank and a bioreaction tank, thus removing organic matter and suspended solids included in the sewage and wastewater;
controlling the concentration of adhered and suspended microbes included in the sewage and wastewater that has passed through the microbe contact tanks and the bioreaction tank by moving part of the sewage and wastewater that has passed through the step of forming MLSS to a settling tank and recirculating part of the sewage and wastewater to the distribution tank and the measuring tank;
separating MLSS included in the sewage and wastewater into solids and liquids in the settling tank; and
treating sludge by recirculating part of the solids included in the sewage and wastewater that has passed through the step of separating MLSS to the distribution tank and the measuring tank, passing recirculating solids through a sludge thickener, thus treating the solids, and discharging supernatant liquids to the outside.

9. The method of purifying sewage and wastewater according to claim 8, further comprising the steps of:
coagulation by passing liquids included in the sewage and wastewater that has passed through the step of separating MLSS through a chemical reaction tank in which an coagulant is injected, thus reacting phosphorus, suspended solids and a color included in the liquids with the coagulant;
coagulation by passing the liquids that have passed through the step of flocculation through a flocculation tank in which a polymer flocculant is injected; and
treating floc by passing the liquids that have passed through the step of flocculation through an chemical settling tank, separating the liquids, including floc, into solids and liquids, and then passing the separated solids through a sludge thickener, thus treating the solids, and discharging the supernatant liquids to the outside.

10. The method of purifying sewage and wastewater according to claim 9, wherein the polymer is an anionic polymer or a nonionic polymer.

11. The method of purifying sewage and wastewater according to claim 8, wherein the coagulant used in the step of injecting a coagulant is PAC or an iron salt.

* * * * *

UNITED STATES PATENT AND TRADEMARK OFFICE
CERTIFICATE OF CORRECTION

PATENT NO. : 7,452,469 B1 Page 1 of 1
APPLICATION NO. : 11/761935
DATED : November 18, 2008
INVENTOR(S) : Kyung Jin Kim It is certified that error appears in the above-identified patent and that said Letters Patent is hereby corrected as shown below:

Column 27, claim 5:
LINE 14:   please delete "floe" and insert --floc--

Column 28, claim 8:
LINE 27:   please delete "recirculating" and insert --non-recirculated--

Signed and Sealed this

Tenth Day of February, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,452,469 B1  
APPLICATION NO. : 11/761935  
DATED : June 12, 2007  
INVENTOR(S) : Kyung-Jin Kim Page 1 of 1

It is certified that error appears in the above-identified patent and that said Letters Patent is hereby corrected as shown below:

Title Page item 54 and Col. 1

Correct Title of Patent to read as follows:

APPARATUS HAVING ROTARY ACTIVATED BACCILLUS CONTACTOR FOR PURIFYING SEWAGE AND WASTEWATER AND METHOD USING THE SAME

Signed and Sealed this

Thirtieth Day of June, 2009

JOHN DOLL  
*Acting Director of the United States Patent and Trademark Office*

UNITED STATES PATENT AND TRADEMARK OFFICE
CERTIFICATE OF CORRECTION

| | |
|---|---|
| PATENT NO. | : 7,452,469 B1 |
| APPLICATION NO. | : 11/761935 |
| DATED | : November 18, 2008 |
| INVENTOR(S) | : Kyung-Jin Kim |

Page 1 of 1

It is certified that error appears in the above-identified patent and that said Letters Patent is hereby corrected as shown below:

Title Page item 54 and Col. 1

Correct Title of Patent to read as follows:

APPARATUS HAVING ROTARY ACTIVATED BACCILLUS CONTACTOR FOR PURIFYING SEWAGE AND WASTEWATER AND METHOD USING THE SAME

This certificate supersedes the Certificate of Correction issued June 30, 2009.

Signed and Sealed this

Twenty-eighth Day of July, 2009

JOHN DOLL
*Acting Director of the United States Patent and Trademark Office*